(12) United States Patent
Yamamoto et al.

(10) Patent No.: US 11,119,372 B2
(45) Date of Patent: Sep. 14, 2021

(54) DISPLAY DEVICE

(71) Applicant: Japan Display Inc., Minato-ku (JP)

(72) Inventors: Koji Yamamoto, Minato-ku (JP); Hiroyuki Abe, Minato-ku (JP); Naoki Miyanaga, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 206 days.

(21) Appl. No.: 15/890,994

(22) Filed: Feb. 7, 2018

(65) Prior Publication Data

US 2018/0231853 A1 Aug. 16, 2018

(30) Foreign Application Priority Data

Feb. 14, 2017 (JP) .............................. JP2017-025305

(51) Int. Cl.
*G02F 1/1362* (2006.01)
*G06F 3/044* (2006.01)
*G02F 1/1333* (2006.01)
*G06F 3/041* (2006.01)
(Continued)

(52) U.S. Cl.
CPC ...... *G02F 1/136286* (2013.01); *G02F 1/1337* (2013.01); *G02F 1/1343* (2013.01); *G02F 1/13338* (2013.01); *G02F 1/133345* (2013.01); *G06F 3/0412* (2013.01); *G06F 3/0446* (2019.05); *G06F 2203/04103* (2013.01); *G06F 2203/04107* (2013.01)

(58) Field of Classification Search
CPC ........... G02F 1/136286; G02F 1/13338; G02F 1/1337; G02F 1/1343; G02F 1/133345; G06F 3/0412; G06F 3/044; G06F 2203/04103; G06F 2203/04107
See application file for complete search history.

(56) References Cited

U.S. PATENT DOCUMENTS

| 2015/0062054 A1* | 3/2015 | Yun | .......................... G06F 3/044 345/174 |
| 2015/0248044 A1* | 9/2015 | Kimura | ................. G02F 1/1368 349/47 |

(Continued)

FOREIGN PATENT DOCUMENTS

JP    H1195202 A   *   4/1999    ............ G02F 1/1135

OTHER PUBLICATIONS

Aoki et al., Machine Translation of Foreign Patent Document JPH 1195202A, Active Matrix Type Liquid Crystal Display Device, Apr. 9, 1999, pp. 1-7 (Year: 1999).*

*Primary Examiner* — Sepehr Azari
(74) *Attorney, Agent, or Firm* — Oblon, McClelland, Maier & Neustadt, L.L.P.

(57) ABSTRACT

A third metal wire, a common power supply line, a sensor power supply line, a selector switch 58, and a shield portion are provided. The third metal wire is provided on a first sensor electrode formed in a display region of an array substrate. The common power supply line and the sensor power supply line are provided in a peripheral region of the array substrate. The selector switch 58 is configured to supply either DC common voltage or AC sensor voltage to the first sensor electrode. The shield portion has a mesh shape. The shield portion is provided above the sensor power supply line. The shield portion is formed using the same material as the third metal wire.

14 Claims, 22 Drawing Sheets

(51) Int. Cl.
*G02F 1/1343* (2006.01)
*G02F 1/1337* (2006.01)

(56) References Cited

U.S. PATENT DOCUMENTS

| | | | |
|---|---|---|---|
| 2015/0268795 A1* | 9/2015 | Kurasawa | G06F 3/0418 |
| | | | 345/174 |
| 2016/0291786 A1 | 10/2016 | Yokoi | |
| 2018/0181234 A1* | 6/2018 | Hammura | G06F 3/04164 |

* cited by examiner

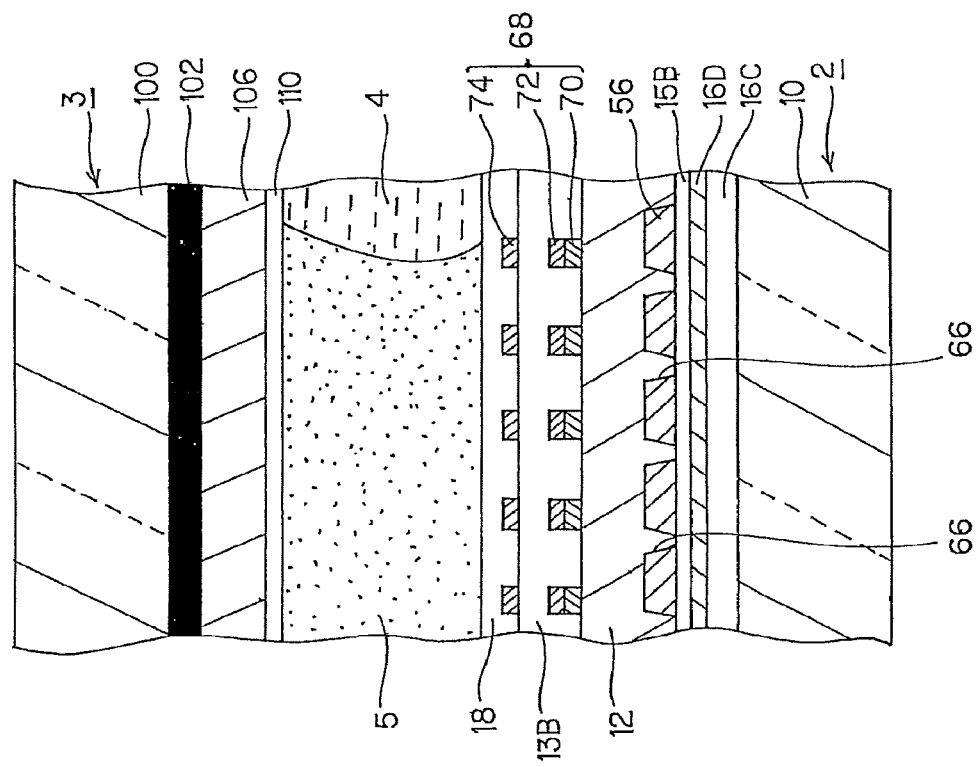
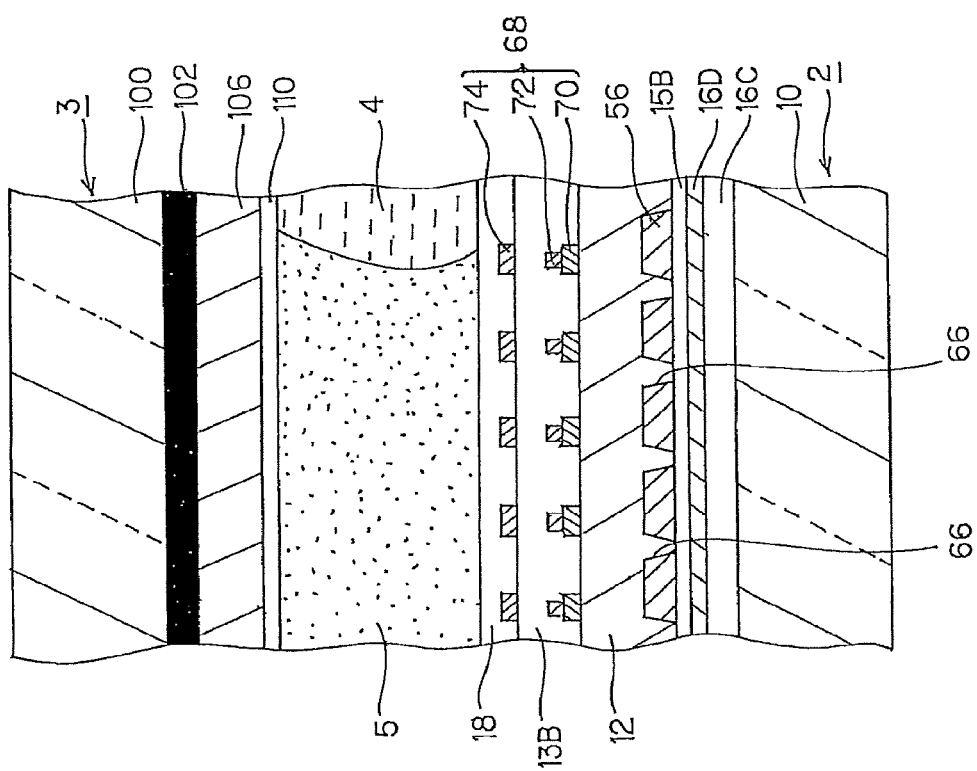

DISPLAY DEVICE

CROSS-REFERENCE TO RELATED APPLICATIONS

This application is based upon and claims the benefit of priority from the prior Japanese Patent Application No. 2017-25305, filed on Feb. 14, 2017; the entire contents of which are incorporated herein by reference.

FIELD

Embodiments of the present invention described herein relate to a display device.

BACKGROUND

In these days, liquid crystal display devices provided with touch sensors are mounted on display devices such as smartphones. The liquid crystal display devices are provided with detection electrodes on surfaces of display panels. In response to a finger of a user touching this detection electrode, the liquid crystal display device detects the touched position and performs a predetermined operation.

In the liquid crystal display devices provided with the touch sensors, high-frequency pulses for touch sensing give rise to noise and adversely affect wireless communication performed by smartphones or the like, which is a problem.

In light of this problem, an object of embodiments of the present invention is to provide a display device that can minimize noise due to the high-frequency pulses for touch sensing.

BRIEF DESCRIPTION OF THE DRAWINGS

FIG. 10A is a cross-sectional view taken along line E-E of FIG. 9;

FIG. 10B is a modification of the structure of a shield portion in longitudinal section;

DETAILED DESCRIPTION

Figure 1:
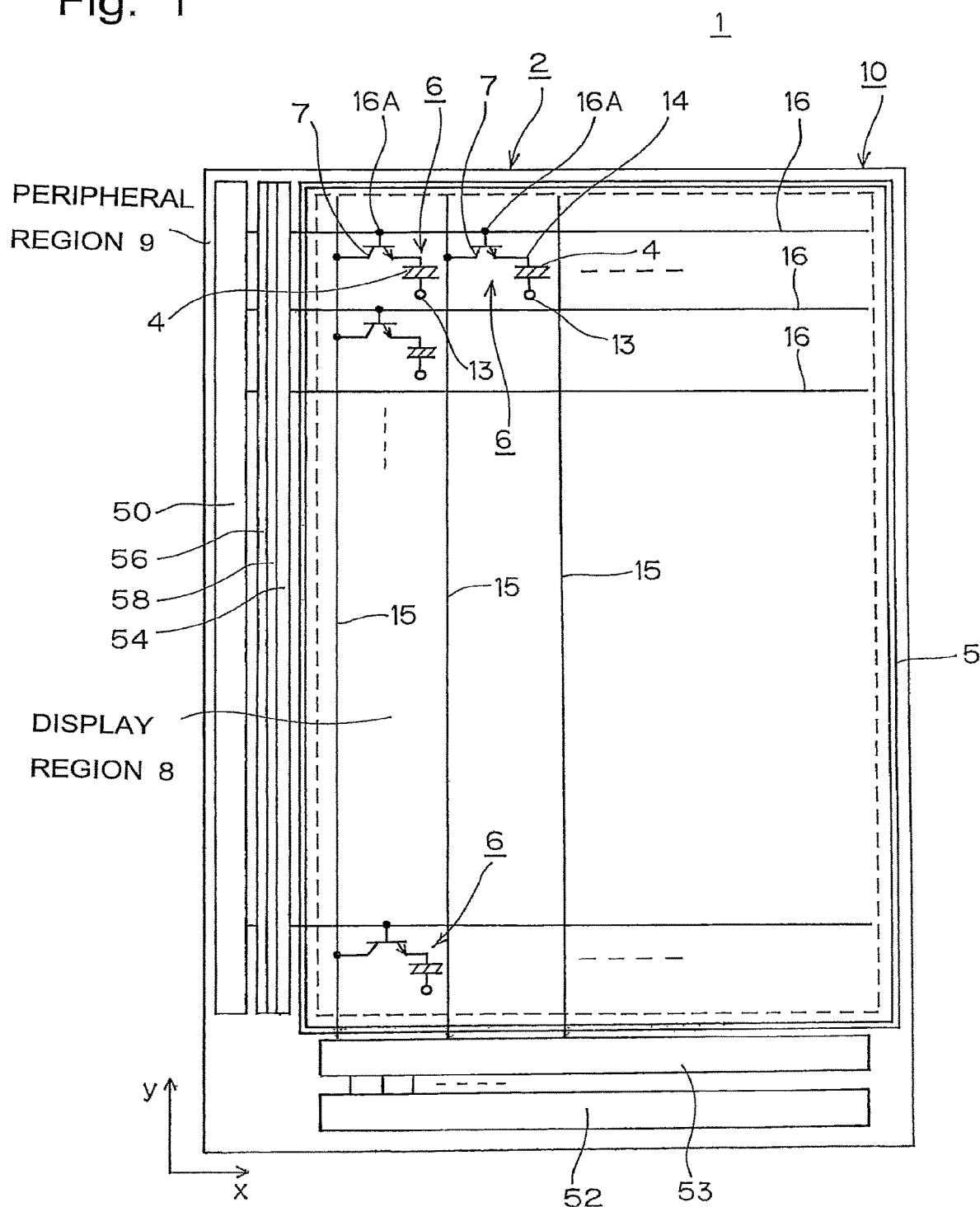
FIG. 1 is a plan view of pixels in a display panel of a liquid crystal display device according to a first embodiment of the present invention.

According to embodiments, a display device includes a first insulating substrate; gate lines in a display region on the first insulating substrate, the gate lines being made from first metal wires; signal lines in the display region, the signal lines being orthogonal to the gate lines, the signal lines being made from second metal wires; pixels at positions where the gate lines and the signal lines intersect, each pixel including a switching element and a pixel electrode connected to the switching element; common electrodes in the display region, the common electrodes being made from first transparent electrodes extending in one direction, the common electrodes serving both as common electrodes and first sensor electrodes; third metal wires on the common electrodes; a common power supply line in one peripheral region of the first insulating substrate, the common power supply line configured to supply DC common voltage to the common electrodes; a sensor power supply line in the one peripheral region, the sensor power supply line configured to supply pulse sensor voltage to the common electrodes; selector switches in the one peripheral region, the selector switches configured to connect either the common power supply line or the sensor power supply line to the common electrodes; and a mesh-shaped shield portion on the sensor power supply line, the shield portion being formed using the same material as the third metal wires. In each embodiment, a display device provided with a display panel in which liquid crystal display elements are employed is disclosed as an example of the display device. It should be noted that each embodiment does not prevent application of respective technical ideas disclosed in each embodiment to display devices in which elements other than the liquid crystal display elements are employed. Examples of the display devices other than the liquid crystal display device include a self-emitting type display panel having organic electroluminescence display elements or the like and an electronic paper type display panel having electrophoresis elements or the like. A liquid crystal display device according to an embodiment of the present invention will be described hereinafter with reference to the accompanying drawings. While certain embodiments shall be described, the embodiments are presented by way of example only and are not intended to limit the scope of the invention. Indeed, the embodiments described herein may be embodied in a variety of other forms, and various omissions, substitution, and changes in the form of the embodiments may be made without departing from the spirit of the invention. The accompanying claims and their equivalents are intended to cover such forms or modifications as would fall within the scope and spirit of the invention. In the drawings, components may be shown schematically regarding the width, thickness, shape and the like, instead of being shown in accordance with the actual sizes, for the sake of clear illustration. The drawings are merely exemplary and do not limit the interpretations of the present invention in any way. In the specification and the drawings, components that are substantially the same as those depicted in a previous drawing(s) bear the identical reference signs thereto, and detailed descriptions thereof may be omitted. Applications of the liquid crystal display device according to the embodiments include lateral electric field display devices sometimes referred to as an in-plane switching (IPS) mode display devices, and particularly fringe field switching (FFS) mode display devices, which use fringe fields and are derived from IPS.

First Embodiment

A liquid crystal display device according to a first embodiment will be described hereinafter with reference to FIGS. 1 to 14.

(1) Overall Configuration of Display Panel 1

A display panel 1 of the liquid crystal display device includes an array substrate 2, a counter substrate 3, a liquid crystal layer 4 held in a gap between the array substrate 2 and the counter substrate 3, and a sealing member 5 whereby peripheral regions 9 of the substrates 2 and 3 are adhered to each other to seal the liquid crystal layer 4. The display panel 1 includes a display region 8 for displaying images and the peripheral region 9 surrounding the display region 8.

(2) Circuitry Configuration of Display Panel 1

The circuitry configuration of the display panel 1 will be described hereinafter with reference to FIG. 1.

As illustrated in FIG. 1, gate lines 16 in a transverse direction (x-axis direction) and signal lines 15 in a vertical direction (y-axis direction) are arranged in a grid pattern in the display region 8 of a glass substrate 10 of the array substrate 2. Pixels 6 are formed at each intersection of the gate lines 16 and the signal lines 15. Each pixel 6 includes a switching element, namely an n-type channel or p-type channel thin film transistor (TFT) 7, and a pixel electrode 14. A gate electrode of the TFT 7 is connected to the gate line 16, a source electrode of the TFT 7 is connected to the signal line 15, and a drain electrode of the TFT 7 is connected to the pixel electrode 14.

A signal line driver 52 and a signal selection circuit 53 are disposed in a lower peripheral region 9 of the array substrate 2. The signal line driver 52 outputs RGB image signals to the signal lines 15.

A gate driver 50 is disposed along the vertical direction in the left peripheral region 9 of the glass substrate 10. The gate driver 50 outputs gate signals to the gate lines 16.

(3) Structure of Touch Sensor

The structure of a touch sensor will be described hereinafter with reference to FIG. 2.

Common electrodes 13 extend in the transverse direction (the x-axis direction) and are disposed at predetermined intervals in the vertical direction (the y-axis direction) on the array substrate 2. The common electrodes 13 serve both as common electrodes and first sensor electrodes.

Furthermore, a common power supply line 54 is wired along the vertical direction on the left side of the common electrodes 13 that extend to the peripheral region 9 of the array substrate 2. The common power supply line 54 supplies DC common voltage to the common electrodes 13 when the display panel 1 displays an image. A sensor power supply line 56 is wired along the vertical direction on the left side of the common power supply line 54. The sensor power supply line 56 supplies high-frequency pulses when the display panel 1 is used as a touch sensor.

The gate driver 50 described above is disposed on the left side of the sensor power supply line 56.

Selector switches 58 are disposed between the common power supply line 54 and the sensor power supply line 56. This selector switch 58 is provided for each of the common electrodes 13 that extend in the transverse direction. These selector switches 58 are used to select whether to supply the common electrodes 13 with the DC common voltage from the common power supply line 54 or the high-frequency pulses from the sensor power supply line 56.

An ENE circuit 60 is disposed between the common power supply line 54 and the display region 8. The ENE circuit 60 controls the ON/OFF timing of the gate signals output from the gate driver 50 to each of the gate lines 16.

The sensor power supply line 56 is connected to a first sensor controller 62. The first sensor controller 62 is disposed in the lower peripheral region 9 of the array substrate 2. The first sensor controller 62 outputs high-frequency pulse sensor voltage for the touch sensor to the sensor power supply line 56.

The common power supply line 54 and the selector switches 58 are also connected to the signal line driver 52. The signal line driver 52 supplies predetermined DC common voltage to the common power supply line 54, and outputs timing signals to the selector switches 58 for switching between displaying and touch sensing.

Second sensor electrodes (hereinafter simply referred to as "sensor electrodes") 112 extend in the vertical direction (the y-axis direction) and are disposed at predetermined intervals in the transverse direction (the x-axis direction) on the surface of the counter substrate 3. Lower ends of the sensor electrodes 112 are connected to a second sensor controller 64. The second sensor controller 64 is disposed in the lower peripheral region 9 of the array substrate 2.

When the display panel 1 is used as a mutual capacitance type touch sensor, the selector switches 58 are switched to the position of the sensor power supply line 56 and the high-frequency pulses are supplied to the common electrodes 13. When the finger of a user contacts or is brought near to the sensor electrode 112, the capacitance between the sensor electrode 112 and the common electrode 13 changes, and the second sensor controller 64 detects the change and the position where the change in capacitance occurred.

The sensor electrodes 112 are not essential to some types of touch sensors. A structure in which electrodes are disposed only on the array substrate 2 also enables touch sensing. This structure may be employed. The present invention is even applicable to this case.

(4) Pixel 6

Figure 3:
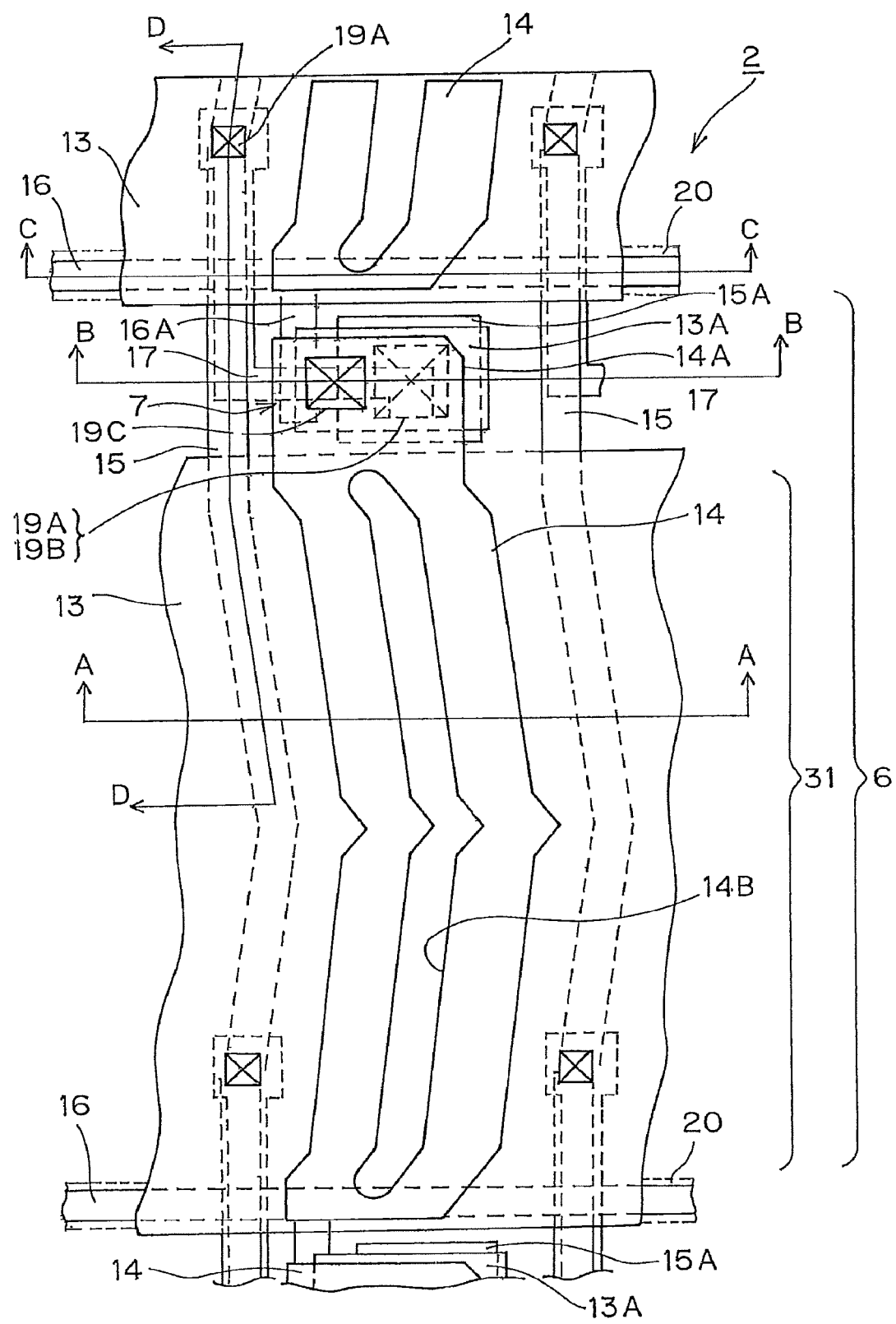
FIG. 3 is an enlarged plan view of the pixel.

The structure of the pixel 6 will be described hereinafter with reference to FIG. 3. As illustrated in FIG. 3, the pixels 6 extend along the direction of the signal lines 15. A large portion of the longitudinal direction region of each pixel 6 corresponds to a pixel opening portion 31. The pixel electrode 14, formed with a slit 14B, is disposed in the pixel opening portion 31. The TFT 7 is formed in one end portion of the pixel 6 and a pixel electrode extension portion 14A extending from the pixel electrode 14 is disposed.

(5) Array Substrate 2

The structure of the array substrate 2 will be described hereinafter with reference to FIGS. 3 to 7.

Figure 5:
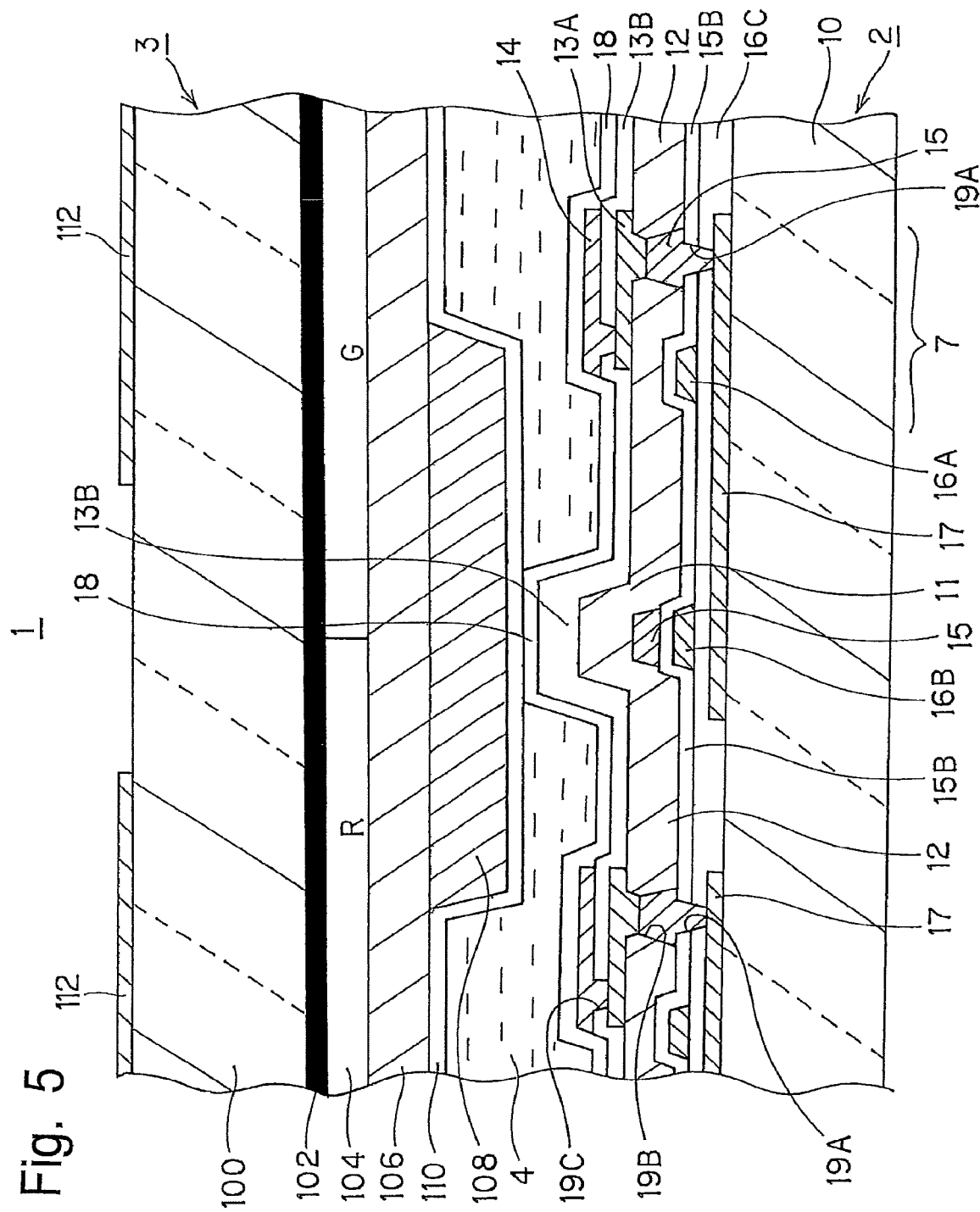
FIG. 5 is a cross-sectional view taken along line B-B of FIG. 3.

A polysilicon interconnect 17 constituting the semiconductor of the TFT 7 is formed on the glass substrate 10 of the array substrate 2 (see FIG. 5).

A gate insulating film 16C is formed on the polysilicon interconnect 17 (see FIG. 5).

Figure 6:
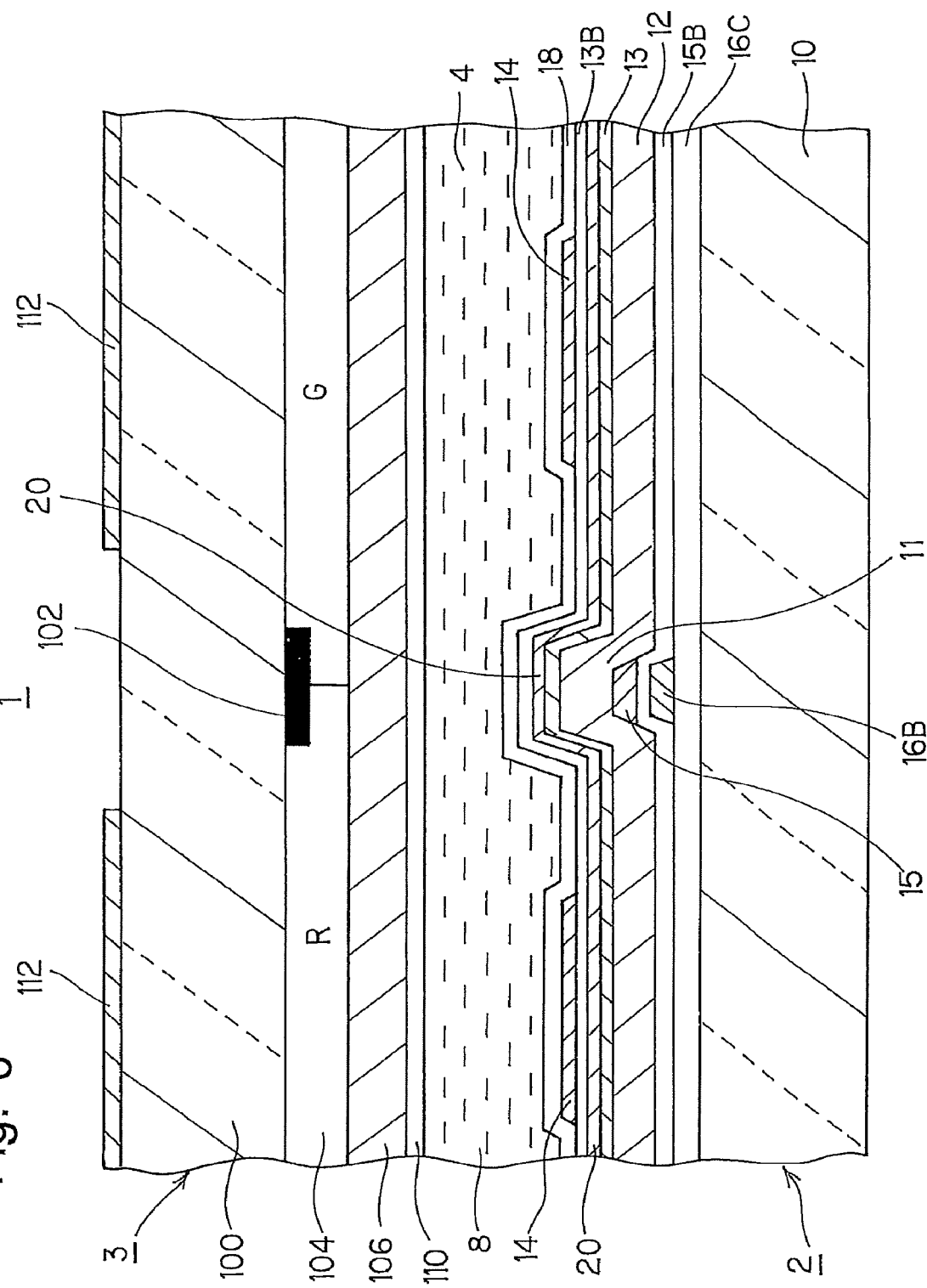
FIG. 6 is a cross-sectional view taken along line C-C of FIG. 3.
Figure 7:
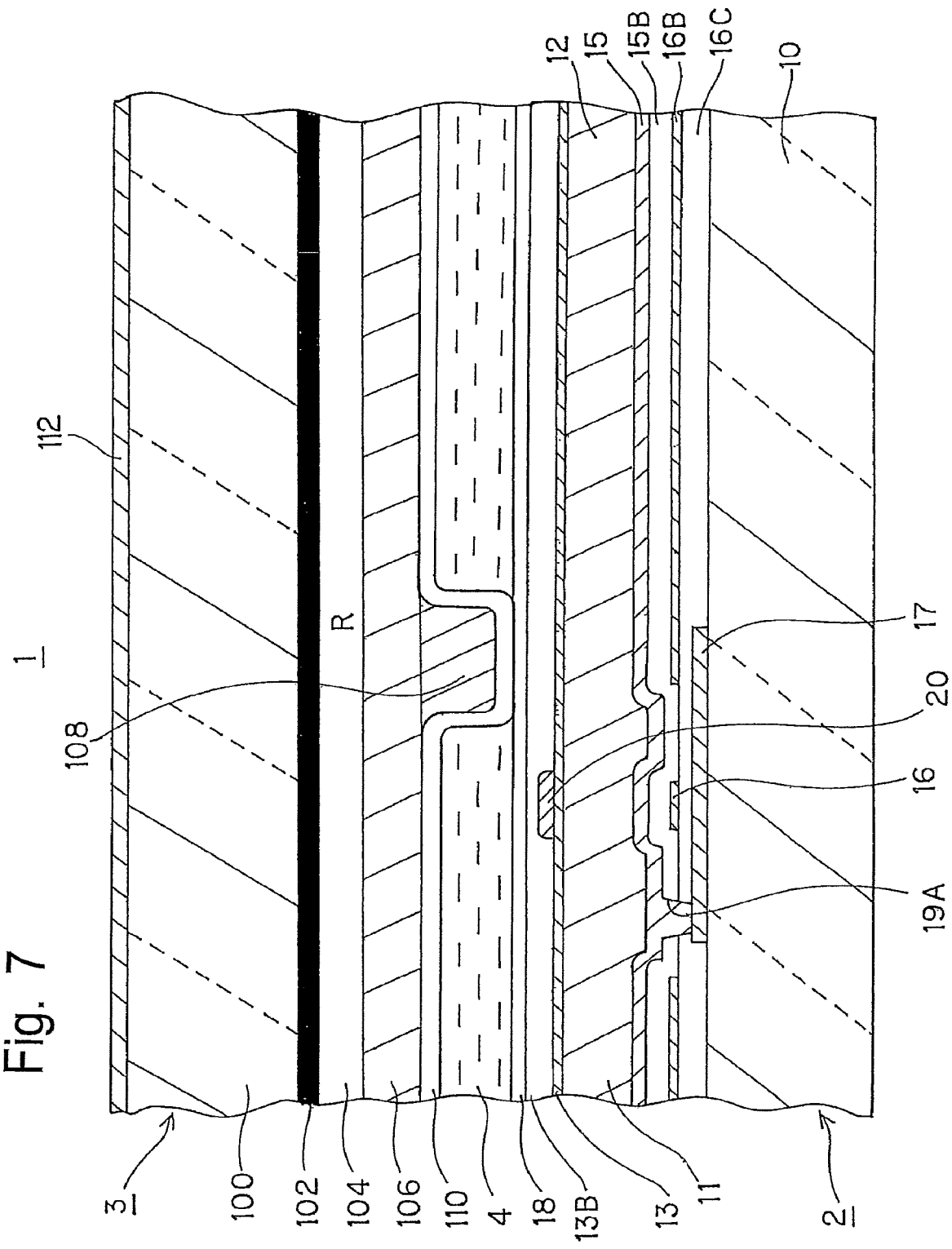
FIG. 7 is a cross-sectional view taken along line D-D of FIG. 3.

The gate lines 16 are formed in parallel in the transverse direction (the x-axis direction) at predetermined intervals on the gate insulating film 16C (see FIGS. 6 and 7). A gate electrode branch line 16A that connects to the TFT 7 extends in the vertical direction at a position of the gate line 16 corresponding to the TFT 7 (see FIG. 5). Additionally, a first metal wire 16B is formed in the vertical direction (see FIGS. 5 and 6). The first metal wire 16B is formed in a direction orthogonal to the transverse direction gate line 16, at a position corresponding to the vertical direction signal line 15. The first metal wire 16B floats with respect to the other conductive layers and is a metal component formed from the same material and on the same layer as the gate line 16. The first metal wire 16B is disposed to increase the height of an array protrusion 11.

A first insulating film 15B is formed on the gate line 16, the gate electrode branch line 16A, and the first metal wire 16B (see FIGS. 3 to 7).

The signal line 15 is formed in the vertical direction (the y-axis direction) on the first insulating film 15B (see FIGS. 5 and 6).

An organic insulating film (flattening film) 12 is formed on the first metal wire 16B and the signal line 15. The organic insulating film 12 is formed thicker on the signal line 15 and the vicinity thereof than at other portions, thereby forming the array protrusion 11 (see FIGS. 5 and 6). Moreover, the array protrusion 11 is formed continuously along the direction of the signal line 15 so as to sandwich the elongated pixel opening portion 31 from the left and the right.

Figure 2:
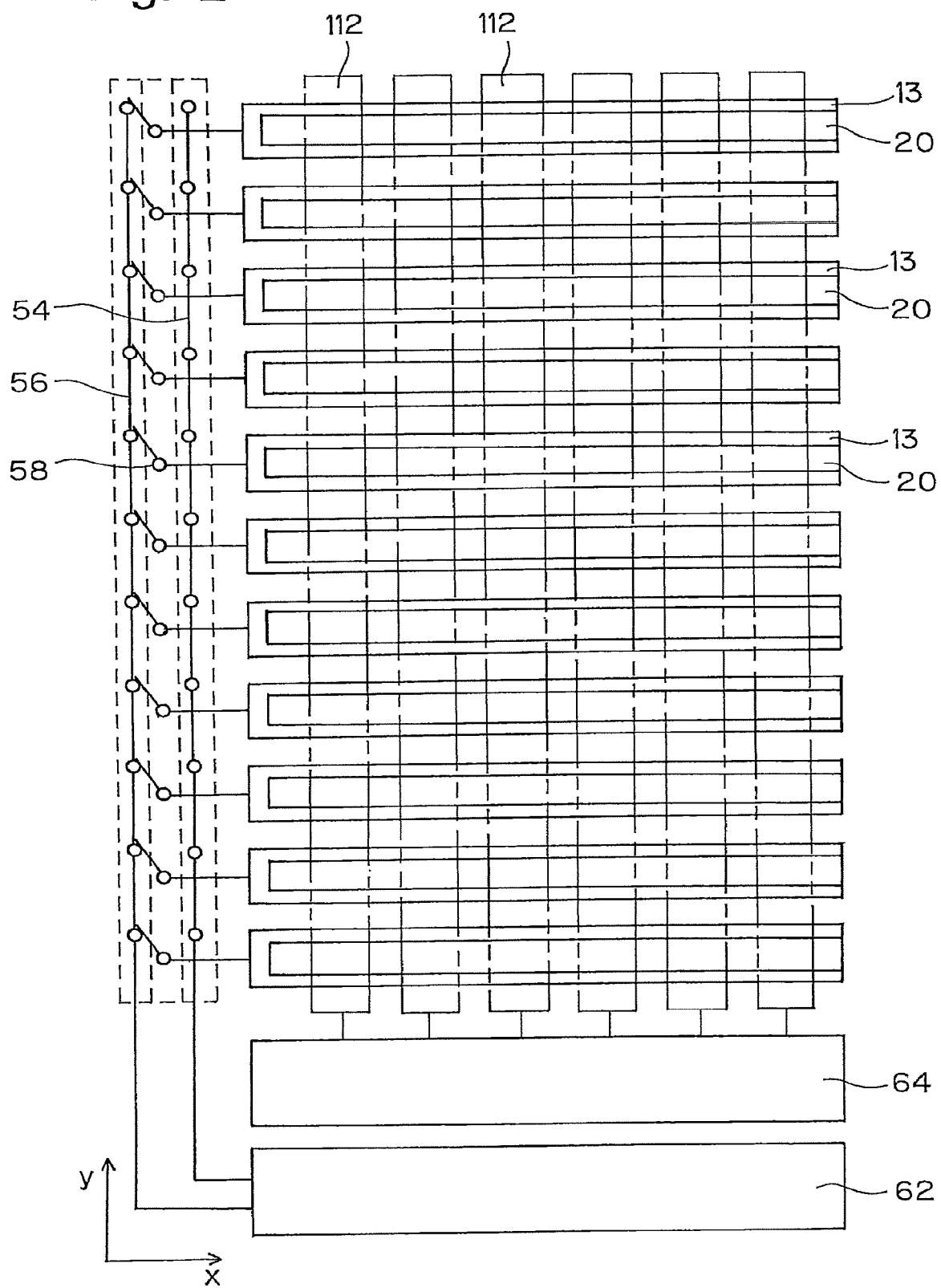
FIG. 2 is a drawing illustrating the relationship between common electrodes and second sensor electrodes.

The common electrode 13, which is made from transparent electrical conductive material such as ITO or IZO, is formed in the transverse direction (the x-axis direction) at a predetermined interval on the organic insulating film 12 of the array protrusion 11 (see FIGS. 2 and 6).

Additionally, a third metal wire 20 is formed in the transverse direction on the gate line 16 and the common electrode 13 (see FIG. 6).

A second insulating film 13B is formed on the common electrode 13, the third metal wire 20, and the like (see FIGS. 3 to 7).

Figure 4:
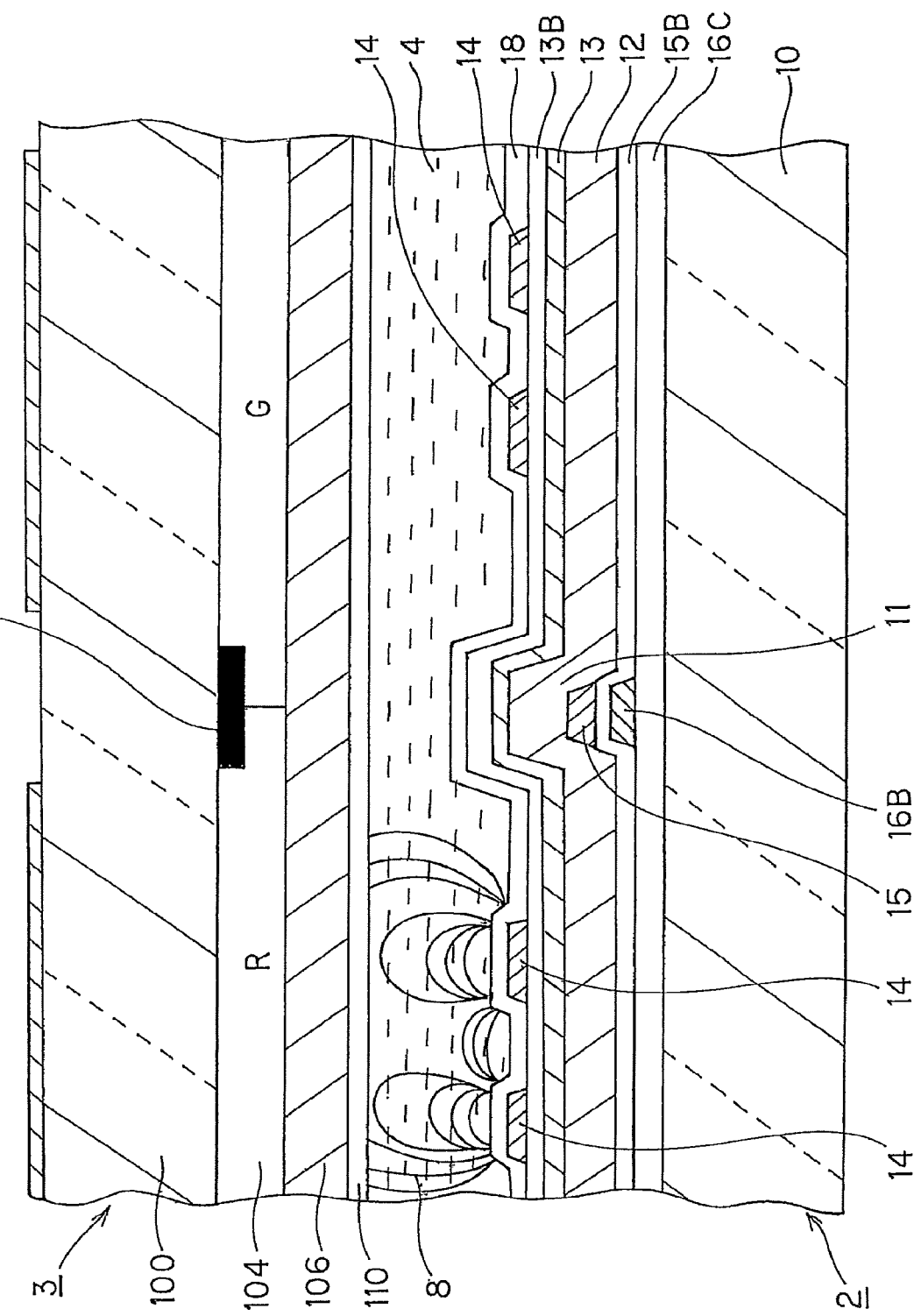
FIG. 4 is a cross-sectional view taken along line A-A of FIG. 3.

The pixel electrode 14 is disposed on the second insulating film 13B (see FIGS. 4 and 6).

An alignment film 18 is formed on the second insulating film 13B and the pixel electrode 14 (see FIGS. 3 to 7). The alignment film 18 is in contact with the liquid crystal layer 4. The alignment film 18 may be a horizontal alignment film oriented via a rubbing process or a photoalignment process, or may be a vertical alignment film.

Next, a more detailed description of the array protrusion 11 is given. The height of the organic insulating film 12 of the array protrusion 11 is greater than the height of the organic insulating film 12 within the pixel opening portion 31, and the organic insulating film 12 of the array protrusion 11 extends along the direction of the signal line 15. As illustrated in FIGS. 5 and 6, the array protrusion 11 includes the polysilicon interconnect 17 formed on the glass substrate 10, the gate insulating film 16C formed on the polysilicon interconnect 17, the first metal wire 16B formed on the gate insulating film 16C, the first insulating film 15B formed on the first metal wire 16B, the signal line 15 formed on the first insulating film 15B, the organic insulating film 12 formed on the signal line 15, the common electrode 13 formed on the organic insulating film 12, the third metal wire 20 formed on the common electrode 13, the second insulating film 13B formed on the third metal wire 20, and the alignment film 18 formed on the second insulating film 13B. The height of the array protrusion 11 is greater than the height of the organic insulating film 12 of the other portions. The first insulating film 15B and the second insulating film 13B may, for example, be formed from inorganic material.

Additionally, as illustrated in FIG. 7, a gate lead line 16D is formed in the transverse direction, continuous with the gate line 16. The gate lead line 16 is formed in the peripheral region of the array substrate 2 at the end portion of each transverse direction gate line 16.

(6) Counter Substrate 3

The counter substrate 3 will be described hereinafter with reference to FIGS. 3 and 4.

A black matrix 102 is formed beneath a glass substrate 100 of the counter substrate 3. The black matrix 102 is provided in a grid pattern using a black resin material. The black matrix 102 includes a vertical portion extending along the signal line 15 so as to cover the signal line 15 and the vicinity of the signal line 15, and a transverse portion extending continuously along each TFT 7 and gate line 16. Thus, the black matrix 102 is formed in the grid pattern. Each opening portion in the grid pattern of the black matrix 102 corresponds to the pixel opening portion 31.

As illustrated in FIG. 4, a color filter layer 104 made from red (R), green (G), and blue (B) is formed under the black matrix 102.

An overcoat layer 106 made from resin is formed under the color filter layer 104.

A counter protrusion 108 is formed under the overcoat layer 106. The counter protrusion 108 has a rectangular shape with rounded corners and is formed along the gate line 16 from the signal line 15 to the TFT 7.

An alignment film 110 is formed under the overcoat layer 106 and under the counter protrusion 108. The alignment film 110 is in contact with the liquid crystal layer 4.

The sensor electrode (second sensor electrode) 112 extends along the vertical direction and is formed at a predetermined interval in the transverse direction (see FIG. 2) on the glass substrate 100 of the counter substrate 3.

(7) Spacer

As illustrated in FIGS. 5 and 7, the peak of the array protrusion 11 and the peak of the counter protrusion 108 contact each other and act as a spacer (photospacer). Specifically, the array protrusion 11 extending along the vertical direction signal line 15 and the counter protrusion 108 extending along the transverse direction gate line 16 combine in a cross shape to form a single spacer.

The spacer formed in this manner can be provided at a ratio of one to a plurality of the pixels 6. For example, the spacer can be provided at a ratio of one per four of the pixels 6 or at a ratio of one per eight of the pixels 6.

As illustrated in FIGS. 5 and 7, the thickness of the liquid crystal layer 4 is maintained by the columnar spacer formed by the array protrusion 11 and the counter protrusion 108.

(8) Peripheral Region 9 of Display Panel 1

Next, the left peripheral region 9 in which the gate driver 50 of the display panel 1 is provided will be described.

Figure 8:
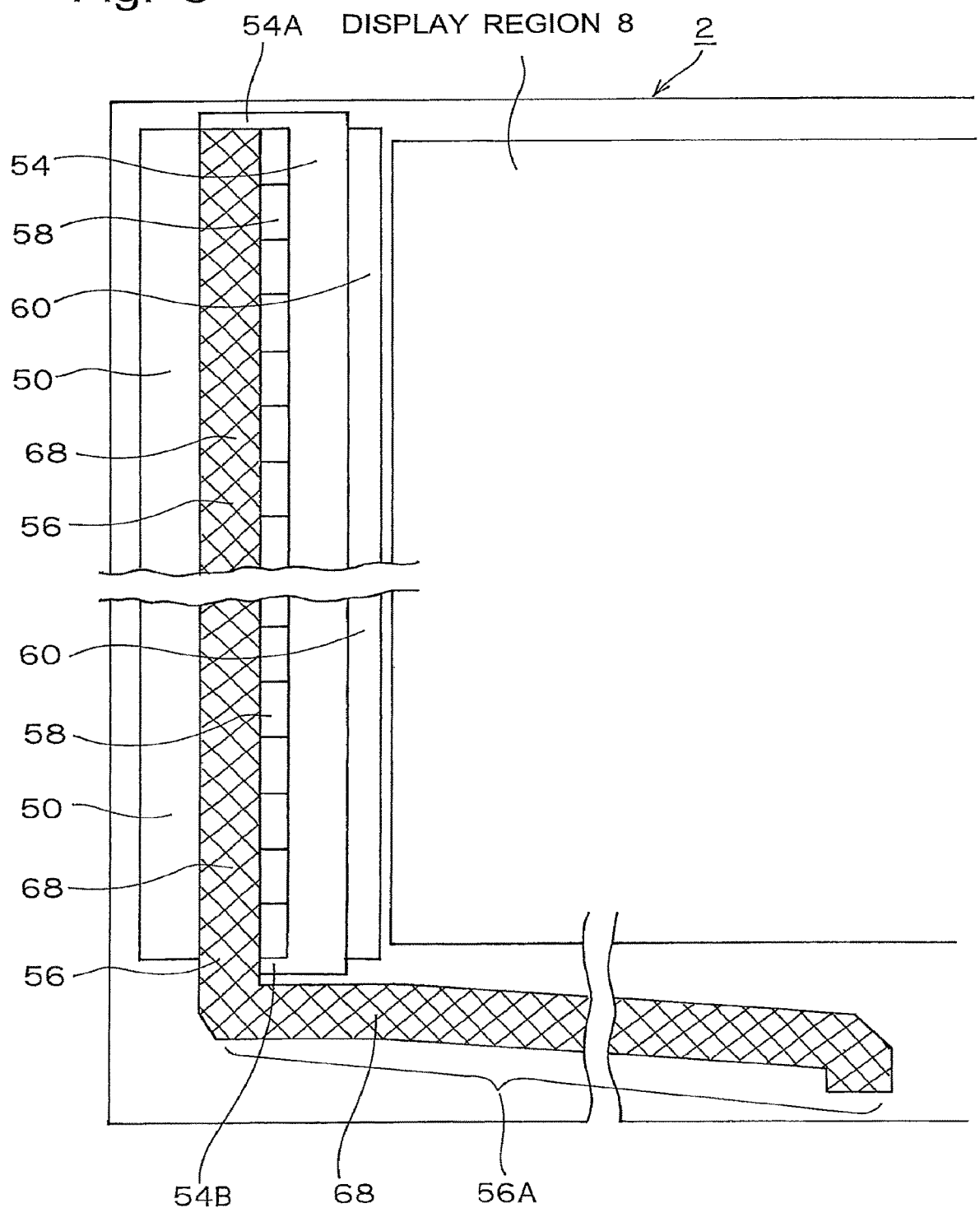
FIG. 8 is a drawing depicting a sensor power supply line.
Figure 9:
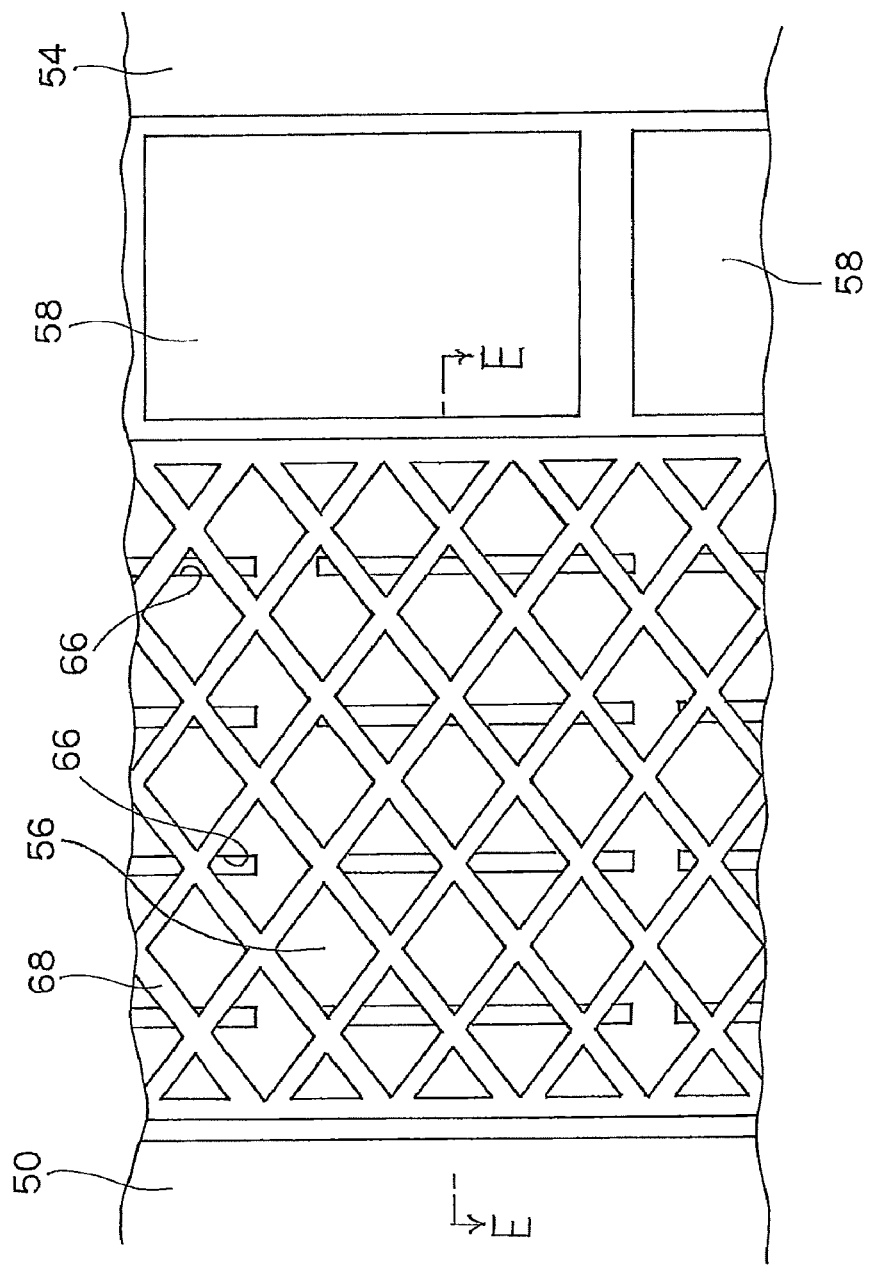
FIG. 9 is an enlarged plan view of the sensor power supply line.

As illustrated in FIGS. 8 and 9, the ENB circuit 60, the common power supply line 54, the selector switches 58, the sensor power supply line 56, and the gate driver 50 are disposed in the left peripheral region 9 in this order from the display region 8 side. The sensor power supply line 56 extends in the vertical direction. Slits 66 are disposed at predetermined intervals in the vertical direction. A shield portion 68 is provided above the sensor power supply line 56. The shield portion 68 is formed in a mesh shape. The shield portion 68 includes three shield layers. This will be described in detail later.

FIG. 9 is an enlarged view illustrating the shield portion 68 overlapping the sensor power supply line 56. FIGS. 10A and 10B are cross-sectional views taken along line E-E of FIG. 9.

As illustrated in FIGS. 10A and 10B, the gate insulating film 16C is formed on the glass substrate 10 of the array substrate 2.

The gate lead line 16D is formed in the transverse direction on the gate insulating film 16C. The gate lead line 16D extends from the display region 8 to the gate driver 50.

The first insulating film 15B is formed on the gate lead line 16D.

The sensor power supply line 56 is formed on the first insulating film 15B. The sensor power supply line 56 is made from the same material as the signal line 15. The slits 66 in the vertical direction are formed in the sensor power supply line 56.

The organic insulating film 12 is formed on the sensor power supply line 56.

A first shield layer 70 is formed on the organic insulating film 12 in a mesh shape. The first shield layer 70 is made from the same material as the common electrode 13.

A second shield layer 72 is formed on the first shield layer 70 in the same mesh shape. The second shield layer 72 is made from the same material as the third metal wire 20.

The second insulating film 13B is formed on the second shield layer 72.

A third shield layer 74 is formed on the second insulating film 13B in the same mesh shape. The third shield layer 74 is made from the same material as the pixel electrode 14.

The alignment film 18 is formed on the third shield layer 74.

The counter substrate 3 is adhered onto the array substrate 2 via the sealing member 5.

DC voltage is supplied to the first shield layer 70 and the second shield layer 72. As illustrated in FIG. 8, power supply positions are an upper end portion 54A and a lower end portion 54B of the sensor power supply line 56 in the vertical direction. The common power supply line 54 supplies the DC voltage at the respective power supply positions.

Note that the "mesh shape" means that the first shield layer 70, the second shield layer 72, and the third shield layer 74 are arranged in a regular manner vertically and transversely to form sides of rhombuses and the inner circumference of the rhombuses are opened as illustrated in FIGS. 8 and 9. For example, the repeating pitch of the rhombuses formed by the shield portion 68 having the mesh shape is 35 μm×35 μm. As illustrated in FIG. 10A, the line width of the first shield layer 70 forming the sides of the rhombuses is 7 μm, the line width of the second shield layer 72 is 3 μm, and the line width of the third shield layer 74 is 7 μm. Moreover, the mesh-shaped first shield layer 70 and the mesh-shaped second shield layer 72 have 83% in capacitance ratio and 49% in coverage ratio as compared to a case where the first shield layer 70 and the second shield layer 72 cover the entirety of the sensor power supply line 56 in a planar manner.

As illustrated in FIG. 8, the sensor power supply line 56 extending in the vertical direction may be bent at a lower end of the left peripheral region 9 and led to the first sensor controller 62 in the lower peripheral region 9 of the array substrate 2. Like the sensor power supply line 56 extending in the vertical direction, the shield portion 68 having the first shield layer 70, the second shield layer 72, and the third shield layer 74 is formed in this lead portion.

As described above, the line width of the mesh-shaped first shield layer 70 and the line width of the mesh-shaped third shield layer 74 are 7 μm, and the line width of the mesh-shaped second shield layer 72 is 3 μm. As illustrated in FIG. 10A, the line width of the second shield layer 72 may be smaller than that of the first shield layer 70 or that of the third shield layer 74. Alternatively, as illustrated in FIG. 10B, the line widths of the first shield layer 70, the second shield layer 72, and the third shield layer 74 may be substantially equal to each other.

(9) Manufacturing Method of Array Substrate 2

An overview of the manufacturing method of the array substrate 2 will be described hereinafter with reference to FIGS. 11 to 14.

Figure 11:
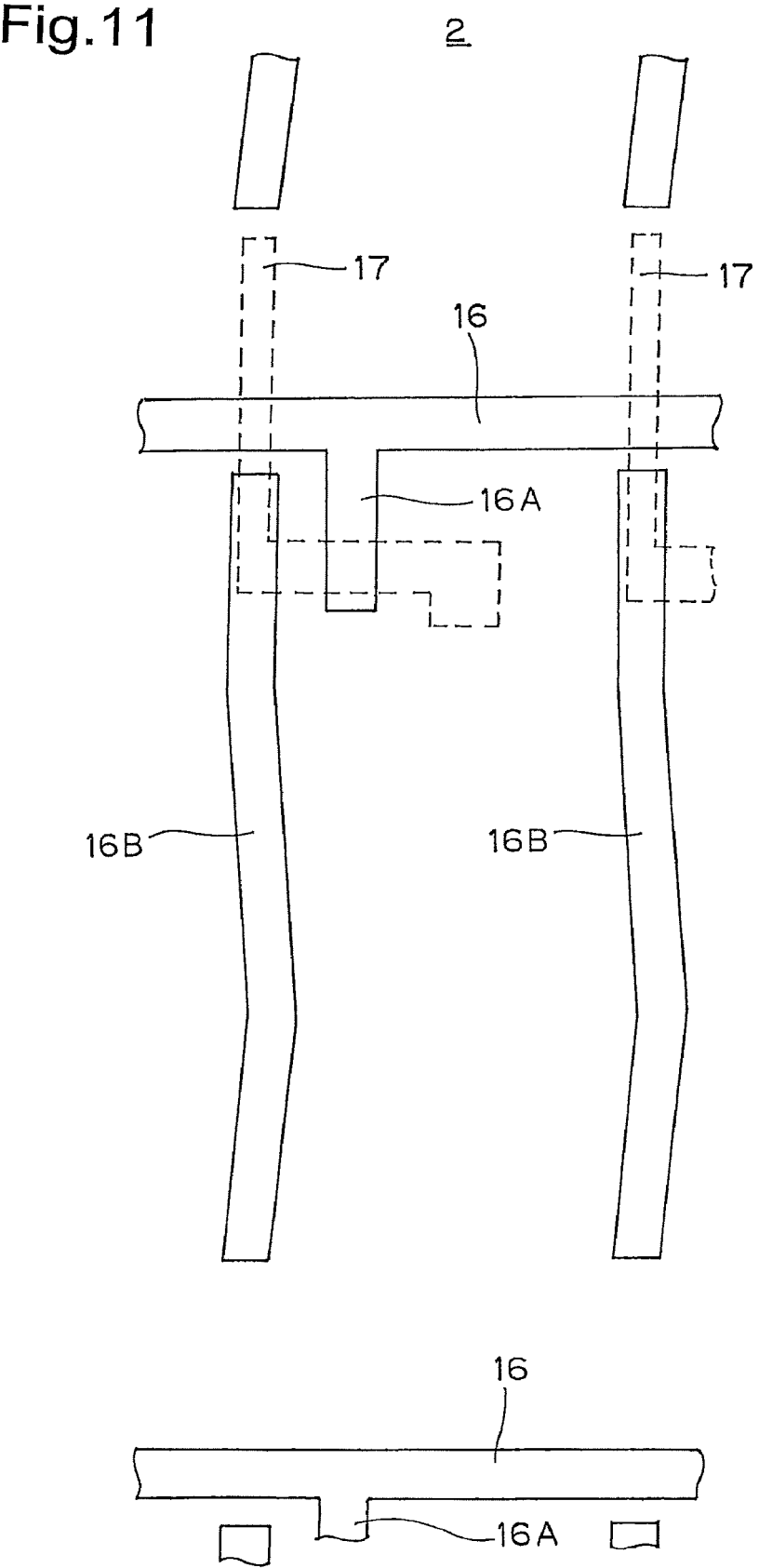
FIG. 11 is a drawing depicting a first process and a second process of a manufacturing method of an array substrate.

In a first process, as illustrated in FIG. 11, for each pixel 6, the polysilicon interconnect 17 is formed on the glass substrate 10 of the array substrate 2 in the vertical direction. Next, the polysilicon interconnects 17 and the entirety of the array substrate 2 are covered by the gate insulating film 16C made from a silicon oxide film, a silicon nitride film, or the like.

In a second process, as illustrated in FIG. 11, a metal layer such as a molybdenum alloy is used to form the gate line 16 in the transverse direction, the gate electrode branch line 16A extending in the vertical direction from the gate line 16, the first metal wire 16B in the vertical direction that is orthogonal to and separated from the gate line 16, and the gate lead line 16D extending from the end of the gate line 16. Next, these lines and the entirety of the array substrate 2 are covered by the first insulating film 15B made from a silicon oxide film, a silicon nitride film, or the like.

Figure 12:
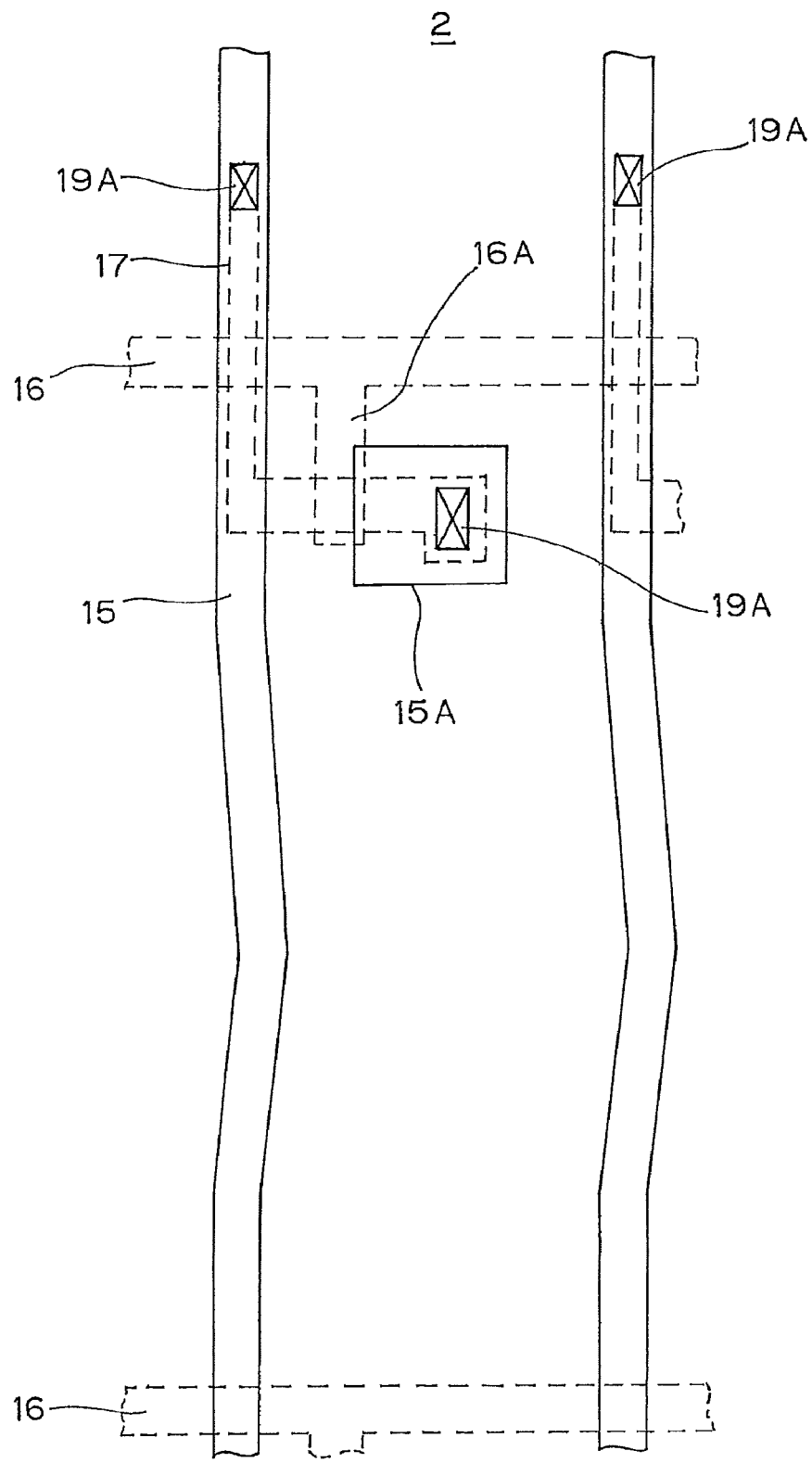
FIG. 12 is a drawing depicting a third process and a fourth process.

In a third process, as illustrated in FIG. 12, contact holes 19A, 19A penetrating through the first insulating film 15B and the gate insulating film 16C and exposing both ends of the polysilicon interconnect 17 are formed.

In a fourth process, as illustrated in FIG. 12, the second metal wire, namely, the signal line 15 is formed in the vertical direction on the first insulating film 15B and on the first metal wire 16B. The signal line 15 is formed using a metal such as aluminum or an alloy thereof (e.g., TAT (Ti/Al/Ti)). At this time, a first island pattern 15A is formed using the same material as the signal line 15 at the contact hole 19A on the TFT 7 side. As illustrated in FIG. 10A, at this time, the sensor power supply line 56 is formed using the same material as the second metal wire.

In a fifth process, the transparent organic insulating film 12 provided with the array protrusion 11 is formed. The signal line 15 and the first island pattern 15A are covered by the organic insulating film 12. Next, a contact hole 19B that exposes a portion of the first island pattern 15A is formed.

Figure 13:
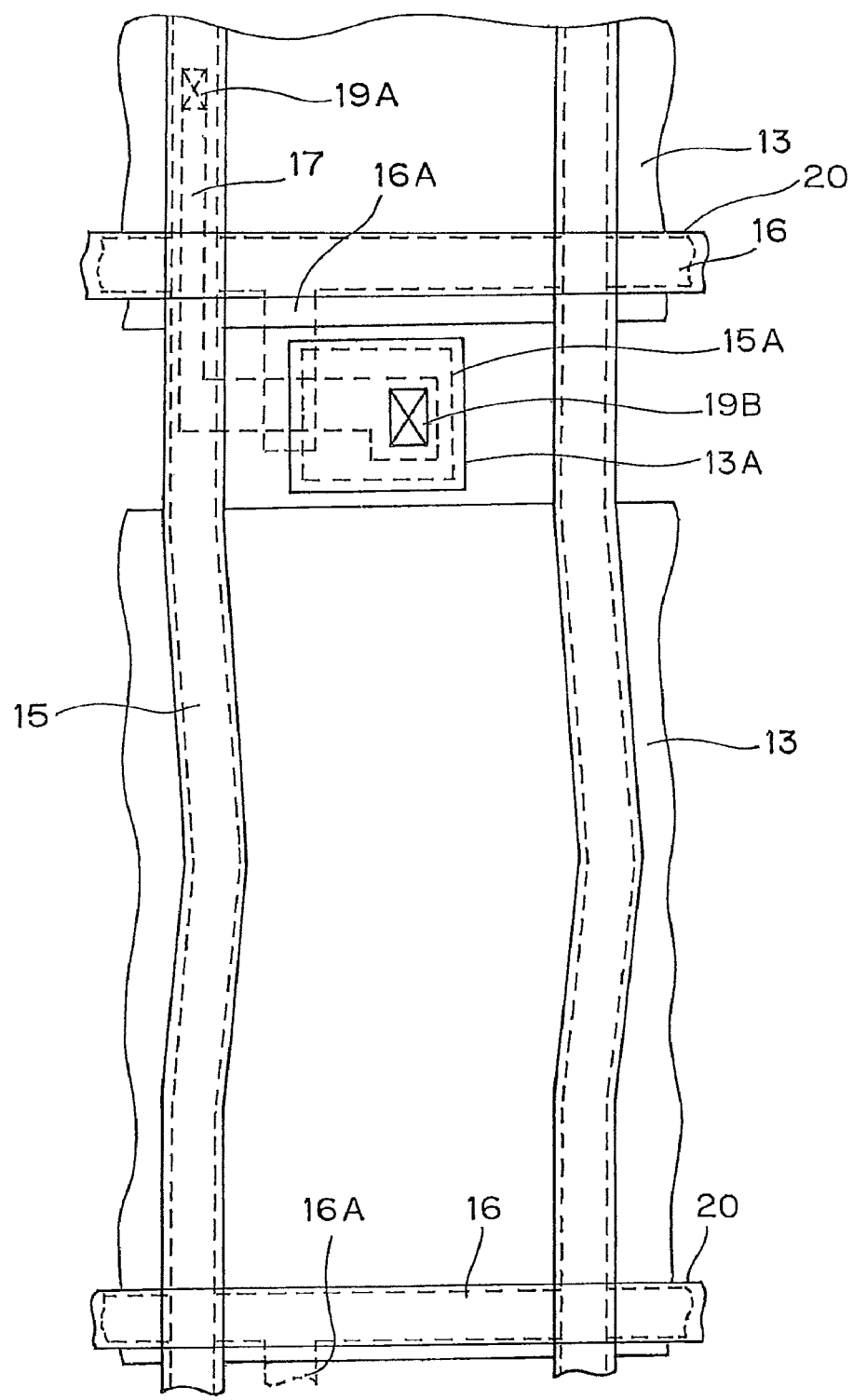
FIG. 13 is a drawing depicting a fifth process and a seventh process.

In a sixth process, as illustrated in FIG. 13, the common electrode 13, which is made from transparent electrical conductive material such as ITO or IZO, is formed on the organic insulating film 12. At this time, a second island pattern 13A is formed using the same material as the common electrode 13 at the TFT 7 portion. As illustrated in FIG. 2, the common electrode 13 is formed in the transverse direction so as to cover the pixels 6 that are arranged side-by-side in the transverse direction. As illustrated in FIG. 10A, the first shield layer 70 is formed in the mesh shape in the peripheral region 9 using the same material as the common electrode 13. In a seventh process, as illustrated in FIG. 13, the third metal wire 20 is formed on the common electrode 13 and on the gate line 16. Examples of the material of the third metal wire 20 include MAM (Mo/Al/

Mo). As illustrated in FIG. 10A, the second shield layer 72 is formed in the mesh shape using the same material as the third metal wire 20.

Figure 14:
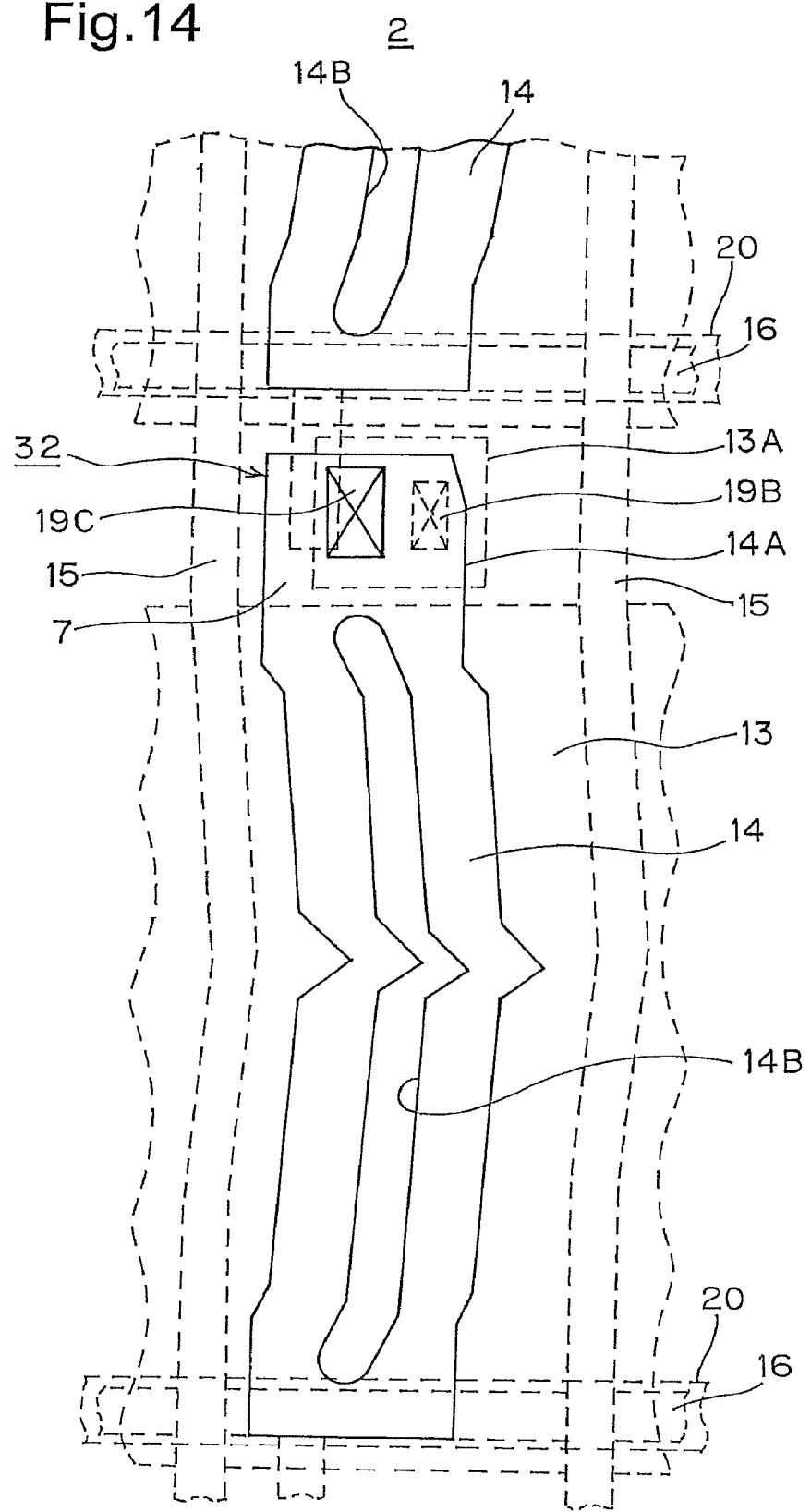
FIG. 14 is a drawing depicting an eighth process and a ninth process.

In an eighth process, as illustrated in FIG. 14, the second insulating film 13B that covers the common electrode 13, the third metal wire 20, and the like is formed on the entirety of the array substrate 2. Next, a contact hole 19C that exposes a portion of the second island pattern 13A is formed.

In a ninth process, as illustrated in FIG. 14, the pixel electrode 14, which is made from transparent electrical conductive material such as ITO or IZO, is formed. The slit 14B is formed in the pixel electrode 14 along the signal line 15. As illustrated in FIG. 10A, the third shield layer 74 is formed in the mesh shape on the second shield layer 72 in the left peripheral region 9 using the same material as the pixel electrode 14.

In a tenth process, the alignment film 18 made from resin is formed on the entirety of the array substrate 2. Finally, the array substrate 2 is subjected to photo alignment treatment by UV irradiation.

(10) Effects

According to this embodiment, the sensor power supply line 56 is covered by the mesh-shaped shield portion 68 including the first shield layer 70, the second shield layer 72, and the third shield layer 74. Therefore, even if the high-frequency pulse sensor voltage is supplied to the sensor power supply line 56, the parasitic capacitance can be reduced, which can provide the electro magnetic interference (EMI) countermeasure while minimizing the deterioration of the touch performance.

The second shield layer 72 made from the same material as the third metal wire 20 is stacked on the first shield layer 70 made from the transparent electrical conductive material, which achieves a lower resistance and further improves the shield effect.

The third shield layer 74 is formed on the first shield layer 70 and the second shield layer 72 in the mesh shape, which enhances the EMI countermeasure.

The first shield layer 70 is formed using the same material as the common electrode 13, the second shield layer 72 is formed using the same material as the third metal wire 20, and the third shield layer 74 is formed using the same material as the pixel electrode 14. Therefore, the respective shield layers 70, 72, 74 can be formed in the same manufacturing process as the display region 8.

The slits 66 are provided in the vertical direction at the predetermined intervals in the sensor power supply line 56. These are, for example, slits which allow light to pass therethrough toward the sealing member 5, which overlaps the light-shielding sensor power supply line 56 as illustrated in FIG. 10A, during the UV irradiation process so as to cure the sealing member 5.

(11) First Modification

Figure 15:
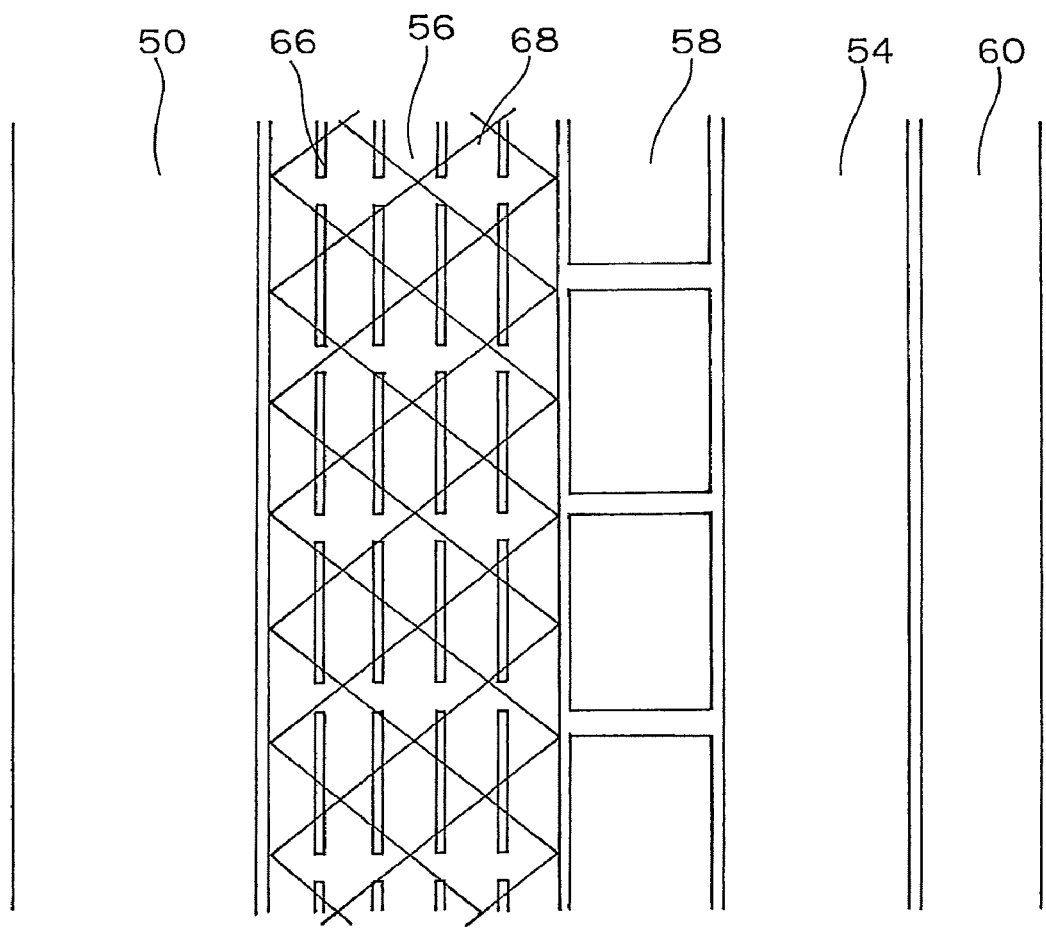
FIG. 15 is an enlarged plan view of a sensor power supply line of a first modification.
Figure 16:
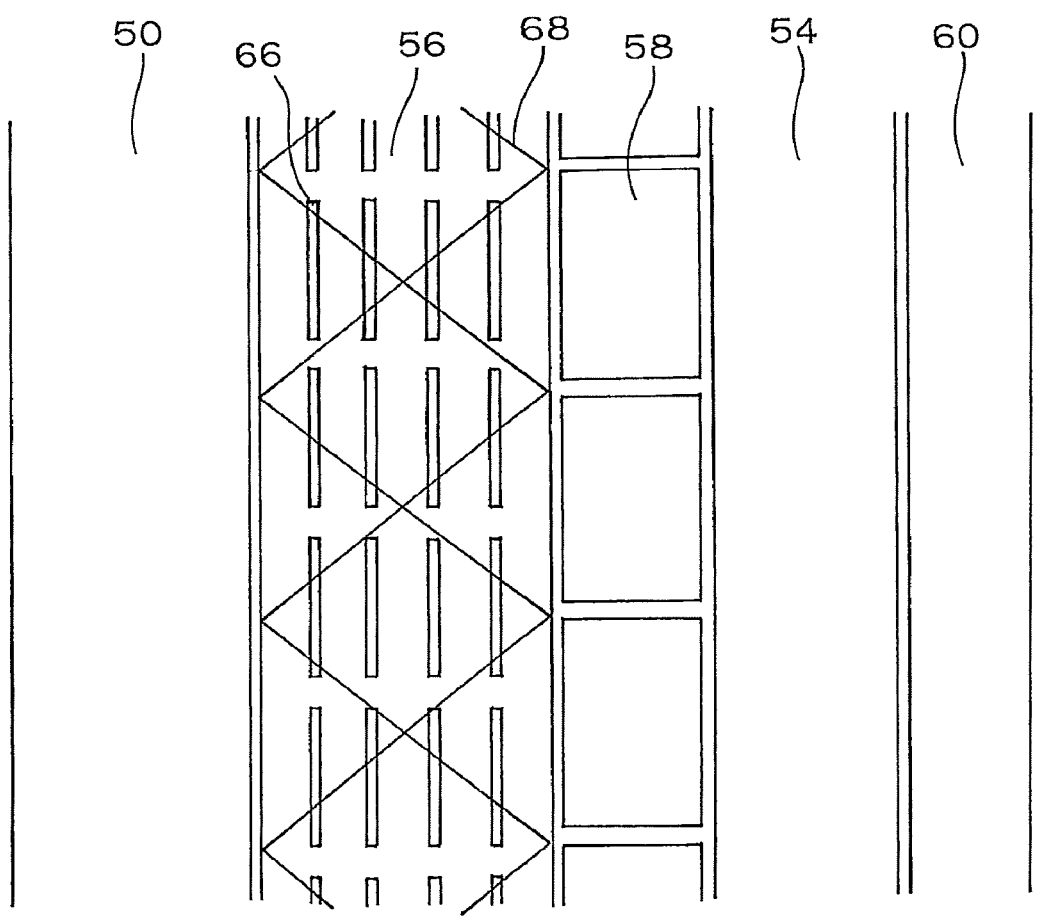
FIG. 16 is an enlarged plan view of a sensor power supply line of another modification of the first modification.

In the above described embodiment, the coverage ratio of the mesh shape of the first shield layer 70, the second shield layer 72, and the third shield layer 74 is 49%, and the repeating pitch thereof is 35 μm×35 μm. The present disclosure is not limited to this embodiment. For example, the coverage ratio may be 26.5% and the repeating pitch may be 70 μm×70 μm as illustrated in FIG. 15. Further alternatively, the coverage ratio may be 13.8% and the repeating pitch may be 140 μm×140 μm as illustrated in FIG. 16.

The coverage ratio is defined based on the assumption that the coverage ratio is 100% when no slit is formed in the sensor power supply line 56. The above described values, that is, 49%, 26.5%, and 13.8% are not necessarily accurate values. The coverage ratio may be defined by a range such as 48% to 51%, 24% to 27%, or 12% to 15%.

In this case, even if the high frequency pulse flows through the sensor power supply line 56, the shield effect of the shield portion 68 serves as the EMI countermeasure.

(12) Second Modification

Figure 17:
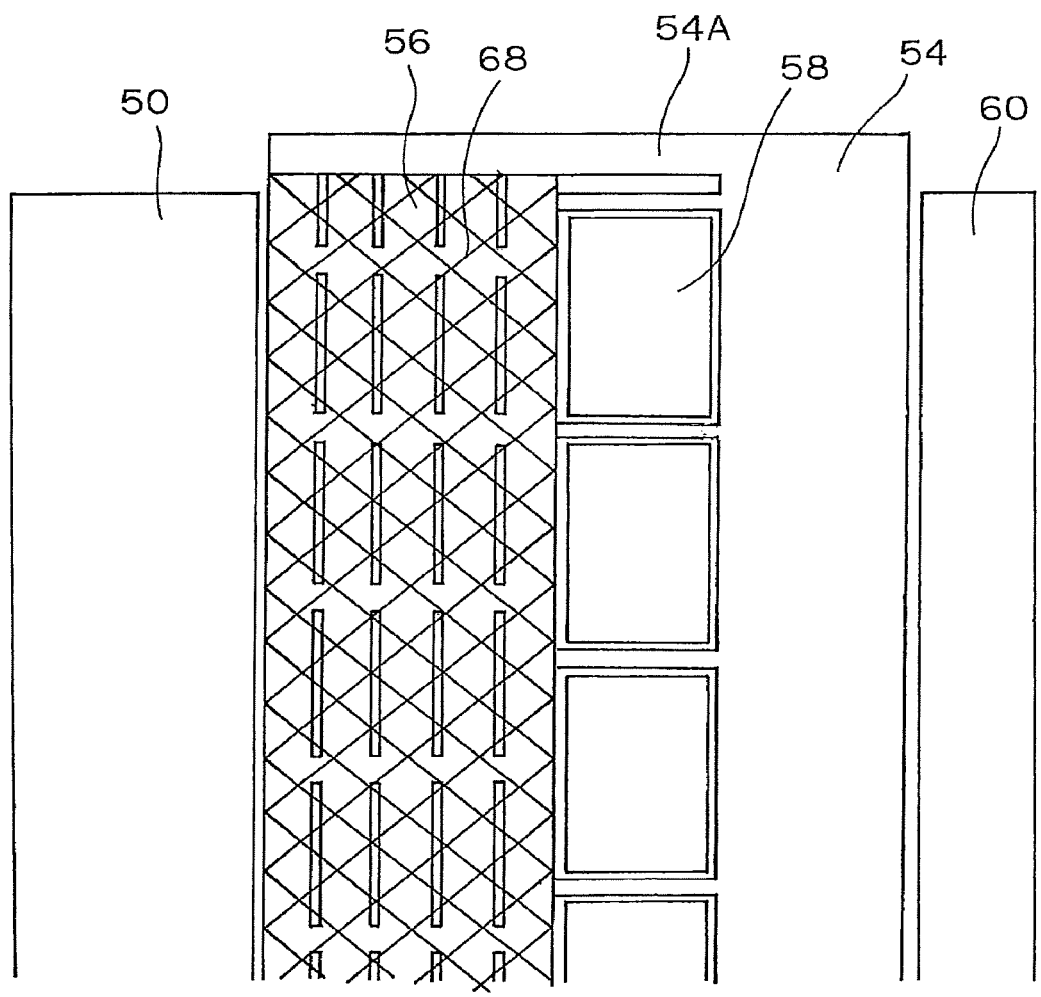
FIG. 17 is an enlarged plan view of a sensor power supply line of a second modification.

In the above described embodiment, the power supply portions to which the voltage is supplied from the common power supply line 54 are provided at the upper and lower portions of the sensor power supply line 56 in the vertical direction. The present disclosure is not limited to this structure. As illustrated in FIG. 17, the voltage may be supplied from the common power supply line 54 for each common electrode 13.

The voltage may be supplied from the common power supply line 54 to the third shield layer 74 for each selector switch 58.

(13) Third Modification

In the above described embodiment, the third shield layer 74 is formed on the second insulating film 13B in the same mesh shape. However, even if this third shield layer 74 is not provided, noise can be reduced.

Second Embodiment

Figure 18:
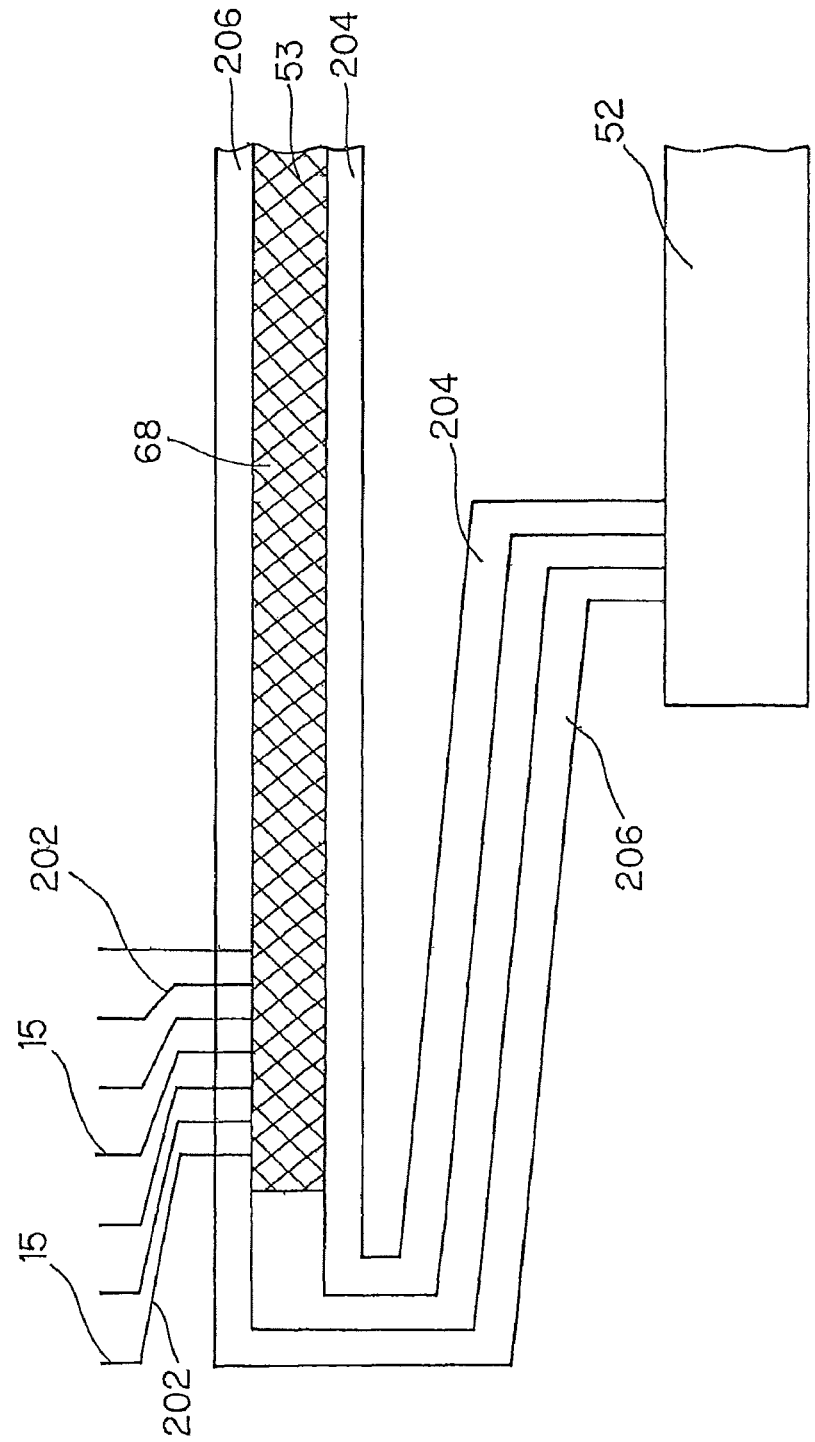
FIG. 18 is a diagram depicting a signal selection circuit according to a second embodiment.
Figure 19:
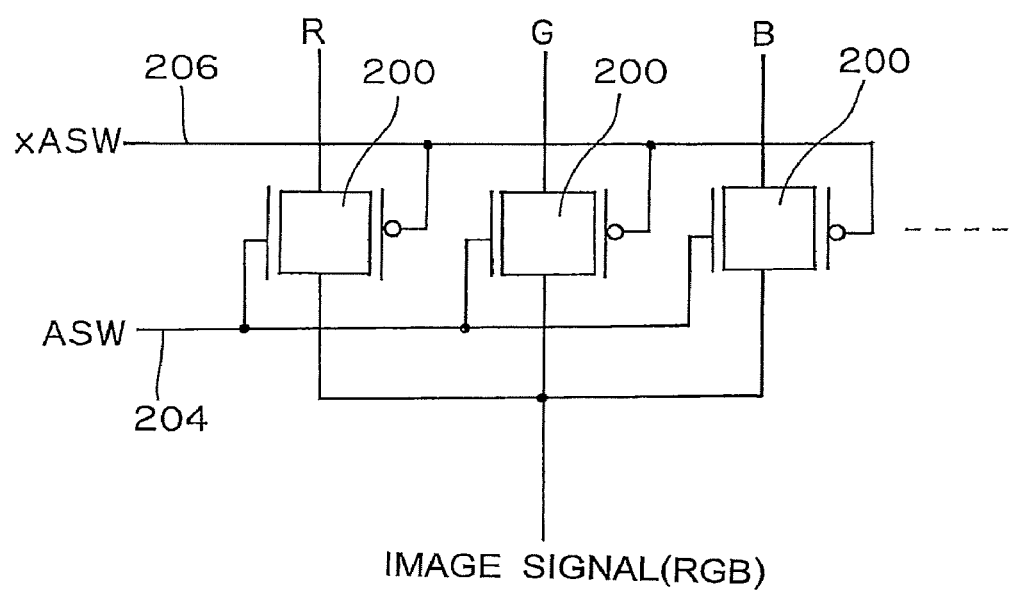
FIG. 19 is a circuit diagram depicting a part of the signal selection circuit according to the second embodiment.

A liquid crystal display device according to a second embodiment will be described hereinafter with reference to FIGS. 18 and 19.

When displaying images, the liquid crystal display device performs column inversion driving, line inversion driving, dot inversion driving, or frame inversion driving which inverts the polarity of image signals.

In order to invert the polarity of the image signals output to the signal lines 15, the signal selection circuit 53 is connected to the signal line driver 52. As illustrated in FIG. 19, the signal selection circuit 53 is provided with analog switches 200 each of which is a combination of an n-type switch and a p-type switch that are made from MOSFETs, for each pixel 6. Here, the "pixel 6" means a pixel that is formed for each of R, G, and B colors. Lead lines 202 from the signal lines 15 are connected to output ends of the analog switches 200. The lead lines 202 are formed on the same layer as the gate lines 16 and using the same material as the gate lines 16. The lead lines 202 are electrically connected to the signal lines 15 via contact holes. The RGB image signals from the signal line driver 52 are input to input ends of the analog switches 200. A first open-close signal wiring 204 and a second open-close signal wiring 206 are connected to control terminals of each analog switch 200, respectively. A first open-close signal ASW and a second open-close signal xASW are input from the signal line driver 52 to the control terminals of the analog switch 200. The signal line driver 52 outputs the first open-close signal ASW and the second open-close signal xASW in synchronization with a timing at which the image is displayed. The timing at which the polarity of the image signal output from the signal selection circuit 53 to the signal line 15 is inverted is selected based on the first open-close signal ASW and the second open-close signal xASW.

In this embodiment, the mesh-shaped shield portion 68 covers an upper layer of the signal selection circuit 53 including the plurality of analog switches 200. The mesh-shaped shield portion 68 is, for example, made from the same material as the third metal wire 20. The voltage is supplied from the common power supply line 54 to the mesh-shaped shield portion 68.

According to this embodiment, noise generated from the analog switches 200 constituting the signal selection circuit 53 can be reduced.

Third Embodiment

Figure 20:
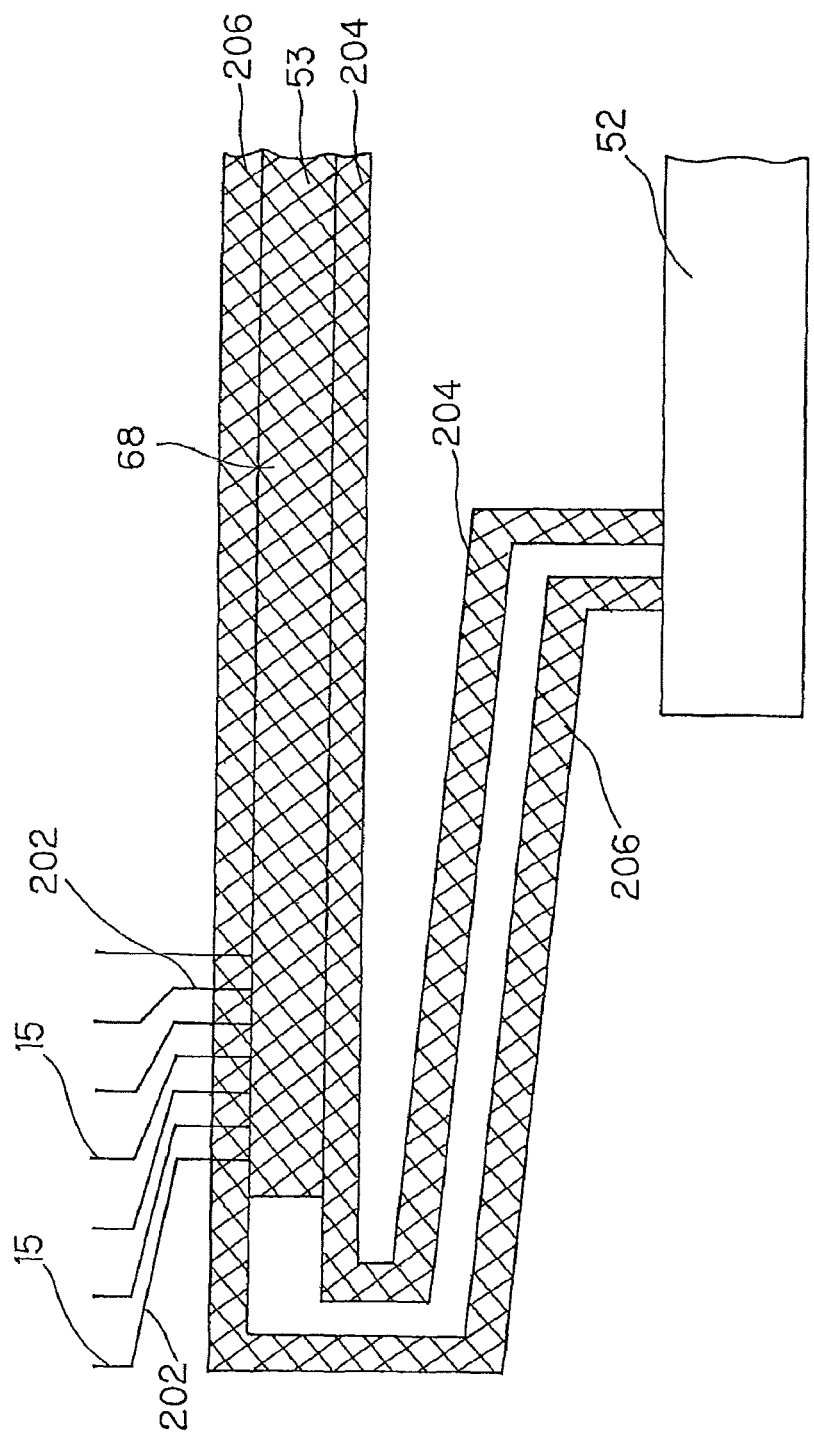
FIG. 20 is a diagram depicting a signal selection circuit according to a third embodiment.

A liquid crystal display device according to a third embodiment will be described hereinafter with reference to FIG. 20.

In the second embodiment, the mesh-shaped shield portion 68 only covers the signal selection circuit 53. In this embodiment, in addition to this structure, the mesh-shaped shield portion 68 covers upper layers of the first open-close signal wiring 204 and the second open-close signal wiring 206 which are connected to the signal selection circuit 53. The voltage is supplied from the common power supply line 54 to the mesh-shaped shield portion 68.

According to this embodiment, noise generated from the signal selection circuit 53, the first open-close signal wiring 204, and the second open-close signal wiring 206 can be reduced.

Fourth Embodiment

Figure 21:
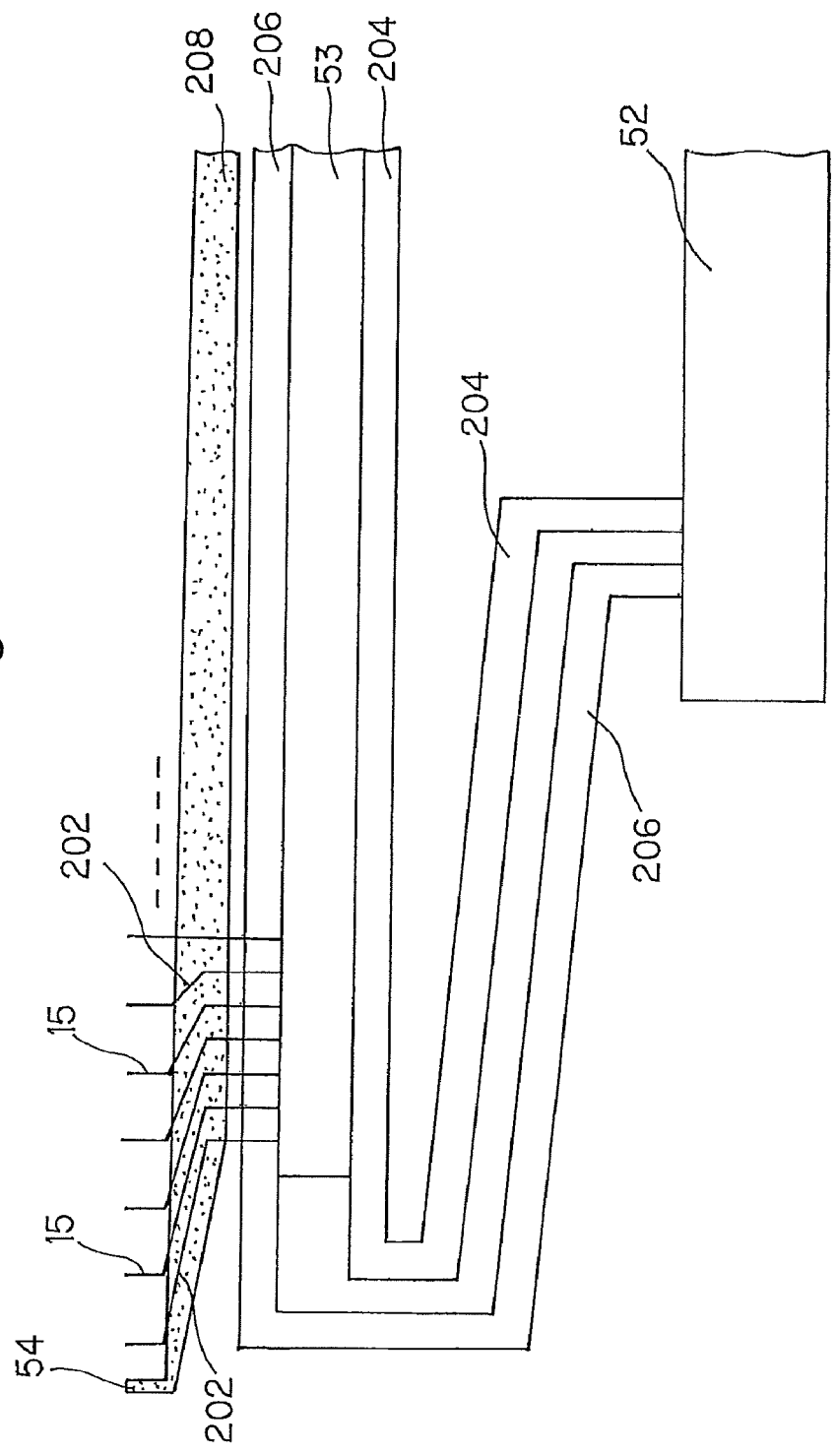
FIG. 21 is a diagram depicting a signal selection circuit according to a fourth embodiment.

A liquid crystal display device according to a fourth embodiment will be described hereinafter with reference to FIG. 21.

In the third embodiment, the mesh-shaped shield portion 68 covers the upper layer of the signal selection circuit 53. Instead of this structure, in this embodiment, a shield plane 208 made of a conductive layer entirely covers upper layers of the lead lines 202 of the signal lines 15. The shield plane 208 is, for example, formed from a second transparent electrode which is the same material as the pixel electrode 14. The voltage is supplied to the shield plane 208 from the common power supply line 54 located on left side of the display region 8.

According to this embodiment, noise generated from the lead lines 202 can be reduced.

Fifth Embodiment

Figure 22:
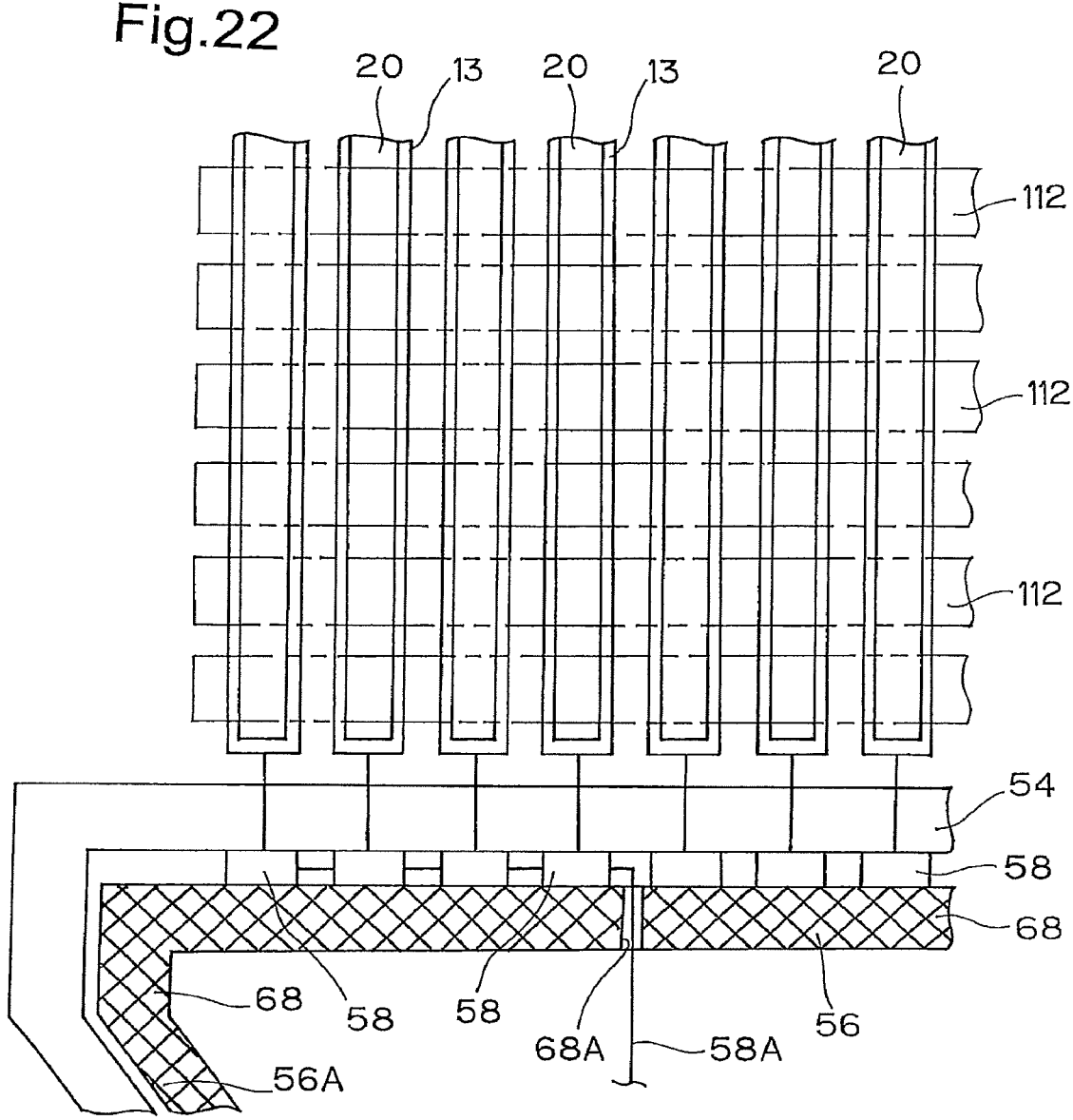
FIG. 22 is a diagram depicting a lower periphery according to a fifth embodiment.

A liquid crystal display device according to a fifth embodiment will be described hereinafter with reference to FIG. 22.

In the first embodiment, the common electrodes 13 provided on the array substrate 2 are formed along the transverse direction (the x-axis direction) and the sensor electrodes 112 provided on the counter substrate 3 are formed along the vertical direction (the y-axis direction).

Instead of this structure, in this embodiment, the common electrodes 13 provided on the array substrate 2 are formed along the vertical direction (the y-axis direction) parallel to the signal lines 15, and the sensor electrodes 112 provided on the counter substrate 3 are formed along the x-axis direction parallel to the gate lines 16.

In this case, the common power supply line 54 and the sensor power supply line 56 are formed in the transverse direction. The common power supply line 54 and the sensor power supply line 56 are formed in the lower peripheral region 9 of the array substrate 2. Thus, the shield portion 68 is formed on the upper layer of the sensor power supply line 56 in the mesh shape. The shield portion 68 includes the first shield layer 70, the second shield layer 72, and the third shield layer 74.

Modifications

Provided that they encompass the spirit of the invention, all embodiments implementable by a person skilled in the art making design changes or modifications to the embodiments described above should be construed to be within the scope of the present invention.

Various modifications and alterations can be conceived by those skilled in the art within the spirit of the present invention, and it is understood that such modifications and alterations are also encompassed within the scope of the present invention. For example, those skilled in the art can suitably modify the above-described embodiment by addition, deletion, or design change of components, or by addition, omission, or condition change of steps. Such modifications are also encompassed within the scope of the present invention as long as they include the gist of the present invention.

Other advantageous effects that are provided by the embodiments and that are obvious from the present specification or appropriately conceivable by those skilled in the art are naturally provided by the present invention.

What is claimed is:

1. A display device comprising:
an array substrate including signal lines arrayed in a first direction, gate lines arrayed in a second direction intersecting the first direction, pixel electrodes located in a display region, common electrodes located in the display region, a shield portion located outside of the display region, an organic insulating film covering the signal lines, inorganic insulating film covering the organic insulating film, and an alignment film covering the inorganic insulating film,
a counter substrate including a color filter; and
a sealing member adhered onto the array substrate and the counter substrate,
wherein
the shield portion is between the organic insulating film and the alignment film,
the common electrodes are between the organic insulating film and the inorganic insulating film,
the pixel electrodes are between the inorganic insulating film and the alignment film,
the shield portion includes a first shield layer,
the first shield layer has a first mesh shape,
the first mesh shape overlaps the sealing member,
the first shield layer is made from a light shield metal material, and
the common electrodes are made from a transparent electrical conductive material,
wherein
the shield portion includes a second shield layer between the organic insulating film and the first shield layer,
the first shield layer is between the second shield layer and the inorganic insulating film,
the second shield layer has a second mesh shape, and
the first mesh shape is stacked on the second mesh shape.

2. The display device of claim 1, wherein
the second mesh shape overlaps the sealing member, and
the second shield layer is made from a same material as the common electrodes.

3. The display device of claim 2, wherein a line width of first mesh shape is smaller than a line width of the second mesh shape.

4. The display device of claim 2, wherein a line width of first mesh shape is same as a line width of the second mesh shape.

5. The display device of claim 2, wherein
the shield portion includes a third shield layer between the inorganic insulating film and the alignment film,
the third shield layer has a third mesh shape, and the third mesh shape overlaps the first mesh shape and the second mesh shape,
the third mesh shape overlaps the sealing member, and
the third mesh shape is in contact with the alignment film.

6. The display device of claim 5, wherein
the pixel electrodes are made from a transparent electrical conductive material,
the third shield layer is made from a same material as the pixel electrodes.

7. The display device of claim 6, wherein
a line width of the third mesh shape is same as a line width of the second mesh shape, and
a line width of the first mesh shape is smaller than the line width of the third mesh shape.

8. The display device of claim 6, wherein the shield portion is disconnected to the common electrodes.

9. The display device of claim 6, wherein
the common electrodes are arrayed in the first direction,
the shield portion is separated from the common electrodes in the first direction, and
the shield portion extends in the second direction.

10. The display device of claim 9, wherein
the array substrate further includes a power supply line extending in the second direction,
each of the first to third mesh shapes include openings that are rhombuses shapes,
the power supply line includes slits,
each of the slits extends in the second direction, and
the shield portion overlaps the power supply line.

11. The display device of claim 10, wherein
the array substrate further includes metal wires extending in the second direction and arrayed in the first direction,
the metal wires are between the common electrodes and the inorganic insulating film,
each of the metal wires is connected to a corresponding common electrode among the common electrodes.

12. The display device of claim 11, wherein
the array substrate further includes a gate driver located outside the display region,
the shield portion is located between the gate driver and the display region, in planar view.

13. The display device of claim 6, wherein
the array substrate further includes a signal selection circuit located outside the display region,
the signal selection circuit is connected to the signal lines,
the shield portion extends in the first direction, and
the shield portion overlaps the signal selection circuit.

14. The display device of claim 6, wherein
the array substrate further includes a gate driver located outside the display region,
the shield portion is located between the gate driver and the display region, in planar view.

* * * * *